United States Patent
Schairer et al.

(10) Patent No.: US 11,783,814 B2
(45) Date of Patent: *Oct. 10, 2023

(54) EFFICIENT AND LOW LATENCY AUTOMATED ASSISTANT CONTROL OF SMART DEVICES

(71) Applicant: GOOGLE LLC, Mountain View, CA (US)

(72) Inventors: David Roy Schairer, San Jose, CA (US); Di Lin, Sunnyvale, CA (US); Lucas Palmer, Windsor (CA)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/506,809

(22) Filed: Oct. 21, 2021

(65) Prior Publication Data

US 2022/0044677 A1 Feb. 10, 2022

Related U.S. Application Data

(63) Continuation of application No. 16/973,392, filed as application No. PCT/US2019/065808 on Dec. 11, 2019, now Pat. No. 11,176,928.

(Continued)

(51) Int. Cl.
*G10L 15/18* (2013.01)
*G10L 15/22* (2006.01)
*G10L 15/30* (2013.01)

(52) U.S. Cl.
CPC .......... *G10L 15/1815* (2013.01); *G10L 15/22* (2013.01); *G10L 15/30* (2013.01); *G10L 2015/223* (2013.01)

(58) Field of Classification Search
CPC ..... G10L 15/1815; G10L 15/22; G10L 15/30; G10L 2015/223; G10L 15/1822;
(Continued)

(56) References Cited

U.S. PATENT DOCUMENTS 8,606,568 B1   12/2013   Tickner et al.
10,089,072 B2  10/2018   Piersol et al.
(Continued)

FOREIGN PATENT DOCUMENTS

CN    102629246      8/2012
KR    20140079328    6/2014

OTHER PUBLICATIONS

The Korean Intellectual Property Office; Notice of Office Action issued in Application No. 10-2020-7028007; 12 pages; dated Oct. 26, 2021.
(Continued)

*Primary Examiner* — Abul K Azad
(74) *Attorney, Agent, or Firm* — Gray Ice Higdon

(57) ABSTRACT

Various implementations relate to techniques, for controlling smart devices, that are low latency and/or that provide computational efficiencies (client and/or server) and/or network efficiencies. Those implementations relate to generating and/or utilizing cache entries, of a cache that is stored locally at an assistant client device, in control of various smart devices (e.g., smart lights, smart thermostats, smart (Continued)

plugs, smart appliances, smart routers, etc.). Each of the cache entries includes a mapping of text to one or more corresponding semantic representations.

20 Claims, 12 Drawing Sheets

Related U.S. Application Data

(60) Provisional application No. 62/915,158, filed on Oct. 15, 2019.

(58) Field of Classification Search
CPC ... G10L 2015/226; G10L 15/02; G10L 15/26; G06F 3/167; G05B 19/042
See application file for complete search history.

(56) References Cited

U.S. PATENT DOCUMENTS

| | | | |
|---|---|---|---|
| 10,091,272 B2* | 10/2018 | Cho | H04L 12/282 |
| 11,176,928 B2* | 11/2021 | Schairer | G06F 3/167 |
| 2014/0122059 A1 | 5/2014 | Patel et al. | |
| 2014/0167931 A1* | 6/2014 | Lee | H04L 12/2818 |
| | | | 340/12.5 |
| 2016/0179787 A1* | 6/2016 | Deleeuw | G10L 15/22 |
| | | | 704/9 |
| 2018/0096683 A1 | 4/2018 | James et al. | |
| 2019/0206388 A1 | 7/2019 | Aggarwal et al. | |
| 2019/0371337 A1 | 12/2019 | Bunker et al. | |
| 2020/0211546 A1 | 7/2020 | Schairer et al. | |
| 2020/0388282 A1* | 12/2020 | Seeker-Walker | G10L 15/22 |
| 2020/0412566 A1 | 12/2020 | Mo et al. | |

OTHER PUBLICATIONS

The Korean Intellectual Property Office; Notice of Office Action issued in Application No. KR10-2022-7024821; 10 pages; dated Dec. 19, 2022.

Japanese Patent Office; Notice of Reasons for Rejection issued in Application No. 2020-546128; 6 pages; dated Dec. 20, 2021.

European Patent Office; Communication pursuant to Article 94(3) EPC issued in Application No. 19832528.4; 10 pages; dated Dec. 22, 2021.

The Korean Intellectual Property Office; Allowance of Patent issued in Application No. 10-2020-7028007; 3 pages; dated Apr. 28, 2022.

European Patent Office; Summons to attend oral proceedings pursuant to Rule 115(1) issued in Application No. 19832528.4, 7 pages, dated May 23, 2022.

India Patent Office; First Examination Report issued in Application No. 202027035966; 8 pages dated May 24, 2022.

Japanese Patent Office; Notice of Allowance issued in App. No. 2020-546128, 3 pages, dated Jun. 27, 2022.

European Patent Office; Communication pursuant to Article 94(3) EPC issued in Application No. 19832528.4; 5 pages; dated Jul. 19, 2021.

European Patent Office; International Search Report and Written Opinion of PCT Ser. No. PCT/US2019/065808; 13 pages; dated Jun. 5, 2020.

India Patent Office; Hearing Notice issued for Application No. 202027035966, 2 pages, dated Apr. 21, 2023.

European Patent Office; European extended search report issued in Application No. 23155883.4, 10 pages, dated Mar. 9, 2023.

* cited by examiner

EFFICIENT AND LOW LATENCY AUTOMATED ASSISTANT CONTROL OF SMART DEVICES

BACKGROUND

Humans can engage in human-to-computer interactions with interactive software applications referred to herein as "automated assistants". For example, a human (which when interacting with an automated assistant may be referred to as a "user") may provide an input to the automated assistant that can cause the automated assistant to generate and provide responsive output, to control one or more smart devices, and/or to perform one or more other functionalities. The input provided by the user can be, for example, a touch input (e.g., via a touchscreen), a gesture (e.g., detected via a camera), and/or a spoken natural language input (i.e., utterance detected via microphone(s)), which may in some cases be converted into text (or other semantic representation) and then further processed.

In many cases, automated assistants include automated assistant clients that are executed locally by assistant client devices and that are engaged with directly by users, as well as cloud counterpart(s) that leverage the more robust resources of the cloud to help automated assistant clients respond to users' inputs. For example, an automated assistant client can provide, to the cloud counterpart(s), an audio recording of a spoken utterance of a user (or a text conversion thereof), and optionally data indicative of the user's identity (e.g., credentials). The cloud counterpart may perform various processing on the query to return result(s) to the automated assistant client, which may then provide corresponding output to the user.

Many users may engage automated assistants using multiple client devices. For example, some users possess a coordinated "ecosystem" of client devices such as smart phone(s), tablet computer(s), vehicle computing system(s), wearable computing device(s), smart television(s), stand-alone assistant-centric interactive speaker(s), standalone assistant-centric interactive displays with speaker(s), among other client devices. A user may engage in human-to-computer dialog with an automated assistant using any of these client devices (assuming an automated assistant client is installed). In some cases these client devices may be scattered around the user's primary residence, secondary residence, workplace, and/or other structure(s). For example, mobile client devices such as smart phones, tablets, smart watches, etc., may be on the user's person and/or wherever the user last placed them. Other client devices, such as traditional desktop computers, smart televisions, and standalone assistant-centric devices may be more stationary, but nonetheless may be located at various places (e.g., rooms) within the user's home or workplace.

Techniques exist to enable user(s) (e.g., a single user, multiple users in a family, co-workers, co-inhabitants, etc.) to utilize an automated assistant client of any one of a coordinated ecosystem of client devices to control any one of a plurality of smart devices that are associated with the automated assistant client. For example, a user can issue a spoken command of "turn off the living room lights" to an automated assistant client of a client device to cause corresponding smart devices (i.e., lights linked to the automated assistant client and labeled as "living room" lights) to be turned off.

In controlling a smart device responsive to user input received at a client device, many existing techniques transmit, via the Internet, data corresponding to the user input, to remote automated assistant server(s). The remote automated assistant server(s): process the data to determine smart device(s) to be controlled based on the request; generate control request(s) for the smart device(s) and based on the request; and transmit, via the Internet, the control request(s) to server(s) of party/parties associated with the smart device(s) (e.g., manufacturer(s) of the smart device(s)). In generating the control request(s), the remote automated assistant server(s) can process the data (e.g., using natural language understanding component(s)) to generate a semantic representation of the data, then generate the control request based on the semantic representation. The server(s) of the separate party receive the control request, then transmit, via the Internet, corresponding control command(s) to the smart device, whether through a hub co-present with the smart device (e.g., in the case of BLE, Z-Wave, ZigBee, etc.) or to the smart device directly via an IP connection (e.g., in the case of Wi-Fi and other smart devices which don't require a hub).

However, such techniques present drawback(s) such as high latency, excessive usage of client and/or server resources, and/or excessive usage of network resources. For example, high latency and/or excessive usage in server resources can be a result of the remote assistant server(s) needing to process received audio data and/or text to generate a semantic representation of a corresponding utterance, and then generate a control request based on the generated semantic representation. High latency can additionally or alternatively be a result of transmission of the request from the remote assistant server(s) to the separate party server(s), which is often exacerbated by the remote assistant server(s) and separate party server(s) not being geographically proximate to one another. Also, for example, excessive usage of network resources can be a result of transmitting high bandwidth audio data and/or text from a client device to remote assistant server(s) and/or a result of transmitting high bandwidth responsive text, speech, and/or graphics (e.g., that confirm requested change(s) to smart device(s)) from the remote assistant server(s) to the client device.

SUMMARY

Recent efforts have been made to shift performance of various automated assistant function(s) from cloud automated assistant component(s) to automated assistant client devices (i.e., client devices that provide automated assistant interface(s)). For example, recent efforts have been made to generate speech recognition models that can be utilized within constraints of hardware resources (e.g., memory resources, processor resources, etc.) of various client devices, while still achieving good results. Likewise, efforts have been made to shift natural language understanding (NLU) and/or fulfillment (e.g., performance of action(s) responsive to user input) on-device. Performing such function(s) on device achieves various technical benefits such as a decrease in latency (e.g., due to no client-server roundtrip), a decrease in network usage (e.g., due to no client-server roundtrip), and/or operability in low-connectivity or no connectivity situations.

However, on-device NLU and/or on-device fulfillment can fail for many requests. As one non-limiting example, consider a spoken utterance that is provided to an assistant client device located in a living room of a user, and that includes "make these lights a bit brighter and make them warmer". Generating an appropriate semantic representation of the spoken utterance requires resolving what is meant by "these lights", "a bit brighter", and "warmer". The limited hardware resources of the assistant client device may prevent local storage and/or usage of machine learning model(s), rule(s), and/or device topologies that are needed to resolve the meanings. However, a remote assistant system, which has more robust resources than the assistant client device, can be capable of resolving the meanings. For example, the remote assistant system can leverage a remotely stored device topology to determine "these lights", for a spoken utterance received at (e.g., heard most loudly and/or clearly at) the living room client device, references living room lights A, B, & C. Further, the remote assistant system can leverage remote machine learning model(s) and/or rule(s) to determine "a bit brighter" means "30% (or other percent or value) brighter than current brightness intensity level(s) of living room lights A, B, & C." Yet further, the remote assistant system can leverage remote machine learning model(s) and/or rule(s) to determine "warmer" means "color temperature that is 20% (or other percent or value) lower than a current color temperature".

Thus, due to hardware and/or other constraints of assistant client devices, a remote assistant system still needs to be utilized in resolving various user requests, such as certain requests to control smart device(s). However, always providing unresolvable audio data and/or text of a spoken utterance to a remote assistant system for full processing can result in excess usage of resources at the remote assistant system and/or excessive latency in performing a corresponding action (e.g., controlling a smart device).

Accordingly, implementations described herein relate to particular techniques, for controlling smart devices, that are low latency and/or that provide computational efficiencies (client and/or server) and/or network efficiencies. Those implementations relate to generating and/or utilizing cache entries, of a cache that is stored locally at an assistant client device, in control of various smart devices (e.g., smart lights, smart thermostats, smart plugs, smart appliances, smart routers, etc.). Each of the cache entries includes a mapping of text to one or more corresponding semantic representations.

The semantic representation(s) of a cache entry can be semantic representation(s) that were previously generated, by one or more remote automated assistant servers (also referred to herein as a "remote assistant system"), responsive to a prior transmission, of the text and/or corresponding audio data, from the assistant client device to the remote assistant system. The cache entry can be stored by the assistant client device in the cache responsive to a cache request that is transmitted by the remote assistant system to the client device responsive to the prior transmission. The text of the cache entry, that is mapped to the semantic representation of the cache entry, can be represented in the cache entry as the text itself, and/or as a representation thereof, such as a Word2Vec embedding thereof and/or a stop word free variant thereof.

As described in detail herein, semantic representation(s) of a cache entry can include cloud semantic representation(s) and/or locally interpretable semantic representations. Locally interpretable semantic representations are interpretable, by the client device, to generate corresponding control command(s) that can be transmitted, by the client device, over one or more local channels and to local smart device(s) and/or smart device controller(s), to cause corresponding local control of smart device(s). The control command(s) can be generated to conform to a protocol suite for the local smart device(s) and/or smart device controller(s). Cloud semantic representations, on the other hand, are transmitted by the client device to the remote assistant system and are interpretable by the remote assistant system to generate corresponding control request(s) to transmit to corresponding smart device control system(s) to cause corresponding control of smart device(s).

A non-limiting example of generating and utilizing cloud semantic representations will now be provided. Assume that a spoken utterance of "dim the lights a touch" is captured in audio data detected via one or more microphones of an assistant client device. The assistant client device can process the audio data, using a local speech-to-text model, to generate recognized text of "dim the lights a touch". The assistant client device can check its local cache to determine whether there are any cache entries that match the recognized text. The assistant client device can determine that no matching cache entries exist, which can be a result of this being an initial instance of the spoken utterance at the assistant client device—or as a result of a previous matching cache entry being recently cleared from the cache (e.g., due to determining a change to a device topology and/or other condition(s)). The assistant client device can optionally further determine that the recognized text is not locally interpretable utilizing on-device NLU component(s). For example, the assistant client device can lack a robust local device topology that enables resolution of "the lights" to specific lights and/or can lack robust model(s) and/or rule(s) that enable resolution of "a touch" to a specific degree.

The client device can further transmit the recognized text and/or the audio data to the remote assistant system. Optionally, the transmission of the text and/or the audio data to the remote assistant system is responsive to determining there is no matching cache entry and/or that the recognized text is not locally interpretable.

In response to receiving the recognized text and/or the audio data (with which the remote assistant system can generate recognized text), the remote assistant system can process the recognized text to generate a cloud semantic representation of the recognized text. For example, the remote assistant system can utilize an account identifier, received with the transmission of text, to identify a corresponding remotely stored device topology for the account identifier. The corresponding device topology can be utilized to resolve "the lights" to lights A & B, based on lights A & B being mapped, in the device topology, as default lights for the assistant client device (e.g., through a user dictated mapping, or as a result of being assigned to the same room). Also, for example, the remote assistant system can determine, utilizing one or more remote model(s) and/or rule(s), that "dim . . . a touch" means "20% (or other percent or value) dimmer than current brightness intensity level(s)". The semantic representation can be generated based on these resolutions and can be, for example, [device(s)=A & B; dimmer, intensity relative 20%], where "A & B" are unique identifiers for the corresponding lights, and where "dimmer, intensity relative 20%" indicates the lights are to be dimmed to a degree that is 20% less relative to their current intensity.

Once the cloud semantic representation is generated, the remote assistant system can then generate control request(s) for effectuating the semantic representation. For example, the remote assistant system can identify "current brightness intensity level(s)" of "lights A & B" based on a most recently reported state of those lights and/or by requesting (and receiving) a current state of those lights from a smart device remote system that controls "lights A & B" (e.g., a smart device remote system controlled by a manufacturer of "lights A & B"). Further, the remote assistant system can generate "target brightness intensity level(s)" by multiplying the "current brightness intensity level(s)" by 0.80 (based on determining "dim a touch" means "20% dimmer than current brightness intensity level(s)"). A control request can then be generated that identifies "lights A & B", and that includes request to set the lights to the generated "target brightness intensity level(s)". The control request can then be transmitted to the smart device remote system. In response to receiving the control request, the smart device remote system then transmits, via the Internet, corresponding control command(s) to "lights A & B", whether through a hub co-present with "lights A & B" (e.g., in the case of BLE, Z-Wave, ZigBee, etc.) or to the smart device directly via an IP connection (e.g., in the case of Wi-Fi and other smart devices which don't require a hub). The control command(s) can match the control request(s) or can differ from the control request(s), but be generated based on the control request(s). Optionally, the remote assistant system also transmits, to the client device, text, audio data, and/or graphic(s) to be rendered to confirm the alteration to the state of "lights A & B". For example, text of "OK, lights A & B dimmed 20%" can be transmitted to the client device, causing the client device to graphically render the text and/or render corresponding synthesized speech using a local text-to-speech model.

Moreover, the remote assistant system can transmit, to the client device, a cache request that includes the cloud semantic representation, and optionally the text (or a representation thereof) and a mapping between the text (or representation) and the cloud semantic representation. In response to receiving the cache request, the client device can generate a cache entry, in a local cache, that defines the mapping of the text to the cloud semantic representation. For example, the cache entry can include a mapping of the text itself to the cloud semantic representation, and/or a mapping of a representation of the text (e.g., a Word2Vec representation or other representation) to the cloud semantic representation. In situations where the cache request itself doesn't include the text (or the representation thereof), the client device can include the mapping based on the cache request being received responsive to a transmission of the text (or corresponding audio data). In some implementations, the remote assistant system can also include, in the cache request, text, audio data, and/or graphic(s) that confirm the alteration to the state of "lights A & B".

Further assume that, after generation of the cache entry at the client device, another instance of the spoken utterance of "dim the lights a touch" is captured in audio data detected via one or more microphones of the assistant client device. The assistant client device can process the audio data, using the local speech-to-text model, to generate recognized text of "dim the lights a touch". The assistant client device can check its local cache and determine that the generated cache entry includes text (or a representation thereof) that matches the recognized text. "Matching", as used herein, can include exact matching and/or soft matching. For example, with soft matching the text "dim lights by a touch" can be determined to match "dim the lights a touch" based on analysis of edit distance, presence/absence of only stop words, and/or utilizing other technique(s). In response to determining the match, the assistant client device can transmit, to the remote assistant system, the cloud semantic representation that is mapped to the text in the cache entry. Optionally, the assistant client device can transmit the cloud semantic representation without any transmitting of the audio data and/or of the recognized text to the remote assistant system.

In response to receiving the cloud semantic representation, the remote assistant system can then generate control request(s) for effectuating the cloud semantic representation. It is noted that, in the example of "dim the lights a touch", the control request(s) can vary in dependence on the "current brightness level(s)" of "lights A & B" at the time of the user input that matches "dim the lights a tough". For example, where the control request(s) specify "target brightness level(s)" for "lights A & B", those target brightness level(s) will be dependent on the "current brightness level(s)". The control request(s) can then be transmitted to the smart device remote system to cause corresponding control of "lights A & B". Accordingly, by transmitting the semantic representation to the remote assistant system, the remote assistant system can bypass processing of the text to again generate the semantic representation—and instead utilize the received cloud semantic representation.

In these and other manners, less processing occurs at the remote assistant system, which can result in reduction in usage of power, memory, and/or processor resources at the remote assistant system. This reduction is especially significant in view of the large quantity (e.g., thousands, hundreds of thousands) of smart device control requests that can be received and processed daily by the remote assistant system. Moreover, in these and other manners, the control requests can be generated and transmitted more quickly, resulting in quicker alteration to the state(s) of the smart device(s). For example, bypassing the generation of the semantic representation from text can save at least 200 ms, 500 ms, 700 ms or other duration in generating the control requests, which can be especially significant in control of various smart devices (e.g., turning on light(s) in a dark room).

In implementations where the cache entry also includes text, audio data, and/or graphic(s) that confirm the alteration to the state of "lights A & B", the assistant client device can also render such content in response to determining the cache entry matches the input. The content can be rendered immediately, or optionally after a delay that can optionally be specified in the cache entry (e.g., a delay that is based on the latency between receiving the input and effectuating the corresponding state change).

It is noted that, in the preceding example, the smart device control request is a state-relative state change request. That is, it requests a change to the state(s) of the smart device(s) in manner that is dependent on the current state(s) of the smart device(s). More particularly, it requests a change to the brightness state(s) of lights A & B in a manner that is relative to the current brightness state(s) of lights A & B. In some implementations, the remote assistant system can determine to provide a cache request that includes semantic representation(s), in lieu of control request(s), responsive to determining the semantic representation(s) are relative state change representation(s). Such determination can be determined based on the semantic representation(s) referencing current state(s) of the smart devices.

In some of those implementations, the remote assistant system can provide a cache request that includes control request(s), in lieu of semantic representation(s), responsive to determining the semantic representation(s) are not relative state change representations. For example, assume instead a spoken utterance of "set the lights to 500 lumens". In such an example, a cloud semantic representation that identifies "lights A & B" and that identifies a "target brightness intensity level" of "500 lumens" for both lights can be generated. Further, a corresponding control request can also be generated. Since the cloud semantic representation is not relative, the remote assistant system can optionally transmit a cache request that includes the control request. In response, the client device can generate a cache entry that maps the text "set the lights to 500 lumens" (or a representation thereof) to the control request. Thereafter, in response to determining received input matches the text of the cache entry, the client device can transmit the control request to the remote assistant system. The remote assistant system can then transmit the control request to the smart device remote system(s), thereby enabling the remote assistant system to utilize the control request directly, thereby bypassing both generation of the semantic representation, and generation of the control request. This can likewise positively impact resource usage of the remote assistant system and/or latency.

It is also noted that, amongst assistant client devices of an ecosystem of a user/account, that certain cache entries can include mappings of the same text to different semantic representations (or control requests). For example, assume "dim the lights a touch" is received at a different assistant client device, and that "lights C & D" are mapped, in the device topology, as the preferred lights for the different assistant client device. In such an example, a semantic representation will be generated that identifies "lights C & D" in lieu of "lights A & B". Accordingly, a cache entry can be generated, for the different client device, that includes a mapping of "dim the lights a touch" to the semantic representation that identifies "lights C & D".

It is also noted that when a spoken utterance is detected at multiple client devices, it can be determined to be received at only one of those client devices utilizing one or more device arbitration techniques. Such techniques can consider various features in determining that a client device should be the receiving device based on determining it is closest to the user and/or is otherwise intended to be interacted with by the user (despite not being the closest). Such feature(s) can include loudness of the spoken audio data at the client device, time of detecting the audio data at the client device, recency of interaction with the client device, user proximity to the client device, and/or other feature(s).

A non-limiting example of generating and utilizing locally interpretable semantic representations will now be provided. Assume again that a spoken utterance of "dim the light a touch" is captured in audio data detected via one or more microphones of an assistant client device. The assistant client device can process the audio data, using a local speech-to-text model, to generate recognized text of "dim the light a touch". The assistant client device can check its local cache to determine whether there are any cache entries that match the recognized text. The assistant client device can determine that no matching cache entries exist, which can be a result of this being an initial instance of the spoken utterance at the assistant client device—or as a result of a previous matching cache entry being recently cleared from the cache. The assistant client device can optionally further determine that the recognized text is not locally interpretable utilizing on-device NLU component(s).

The client device can further transmit the recognized text and/or the audio data to the remote assistant system. Optionally, the transmission of the text and/or the audio data to the remote assistant system is responsive to determining there is no matching cache entry and/or that the recognized text is not locally interpretable.

In response to receiving the recognized text and/or the audio data (with which the remote assistant system can generate recognized text), the remote assistant system can process the recognized text to generate a locally interpretable semantic representation of the recognized text. For example, the remote assistant system can utilize an account identifier, received with the transmission of text, to identify a corresponding remotely stored device topology for the account identifier. The corresponding device topology can be utilized to resolve "the light" to "light C" based on light C being mapped, in the device topology, as a default light for the assistant client device.

Also, for example, the remote assistant system can determine, utilizing one or more remote model(s) and/or rule(s), that "dim . . . a touch" means "20% (or other percent or value) dimmer than current brightness intensity level(s)". The remote assistant system can generate the locally interpretable semantic representation by including an identifier of "light C", as well as a state change representation that is a relative stage change representation that dictates how to locally resolve the target intensity level for "dim a touch". For example, the identifier of "light C" can be a local address for "light C". Also, for example, the state change representation can be "set intensity=(current intensity*0.8)", that indicates the intensity of "light C" should be set to a value that is determined by identifying a current intensity value of "light C" (e.g., a most recently reported intensity, or a locally requested and locally received intensity value) by 80%. Accordingly, in some implementations the locally interpretable semantic representation can define state change representation(s) more granularly than cloud based counterparts, to enable local resolving of relative values that can then be utilized to generate local control command(s) (e.g., utilizing a local adapter as described herein). The state change representation can optionally additionally include: an indication of the adapter that is to be utilized in generating corresponding local control command(s) (e.g., an adapter specific to a manufacturer of the smart device); an indication of the channel (e.g., Bluetooth or Wi-Fi) that is to be utilized to transmit the local control command(s); and/or an indication of the protocol suite that is to be utilized in generating control command(s) based on the locally interpretable semantic representation. The locally interpretable semantic representation can be, for example, [device(s)=C; set intensity=(current intensity*0.8)].

In some implementations, the system can determine to generate a locally interpretable semantic representation in response to: determining that the client device (or an additional client device locally connected to the client device) is capable of locally controlling the smart device(s) referenced in the recognized text; determining that the smart device(s) referenced in the recognized text are capable of being controlled locally; and/or determining that the state change(s) requested in the recognized text are capable of being effectuated for local control (e.g., in situations where some state(s) can be altered through local control, while other(s) can only be altered through cloud control).

Once the locally interpretable semantic representation is generated, the remote assistant system can optionally transmit the locally interpretable semantic representation to the client device for immediate implementation. Put another way, the remote assistant system can transmit the locally interpretable semantic representation to cause the client device to interpret the locally interpretable semantic representation in response to the spoken utterance, generate corresponding local control command(s), and locally transmit the local control command(s) to effectuate the state change to "light C". The transmission of the locally interpretable semantic representation to the client device for immediate implementation can be the transmission of the cache request itself (described below), or a separate transmission. Alternatively, the remote assistant system can instead generate and transmit a corresponding cloud control request, to a smart device control system for "light C", to cause the smart device control system to generate and transmit corresponding control command(s) to "light C" to effectuate the state change.

Regardless of the manner of implementing the state change responsive to the immediate request, the remote assistant system can transmit, to the client device, a cache request that includes the locally interpretable semantic representation, and optionally the text (or a representation thereof) and a mapping between the text (or representation) and the locally interpretable semantic representation. In response to receiving the cache request, the client device can generate a cache entry, in a local cache, that defines the mapping of the text to the locally interpretable semantic representation. For example, the cache entry can include a mapping of the text itself to the locally interpretable semantic representation, and/or a mapping of a representation of the text to the locally interpretable semantic representation. In situations where the cache request itself doesn't include the text (or the representation thereof), the client device can include the mapping based on the cache request being received responsive to a transmission of the text (or corresponding audio data). In some implementations, the remote assistant system can also include, in the cache request, text, audio data, and/or graphic(s) that confirm the alteration to the state of "light C".

Further assume that, after generation of the cache entry at the client device, another instance of the spoken utterance of "dim the light a touch" is captured in audio data detected via one or more microphones of the assistant client device. The assistant client device can process the audio data, using the local speech-to-text model, to generate recognized text of "dim the light a touch". The assistant client device can check its local cache and determine that the generated cache entry includes text (or a representation thereof) that matches the recognized text. Exact matching and/or soft matching can be utilized. In response, the assistant client device can process the locally interpretable semantic representation of the cache entry, to generate corresponding local control request(s) for locally transmitting to "light C". For example, based on the locally interpretable semantic representation including "set intensity=(current intensity*0.8)", the assistant client device can locally identify a "current intensity" of "light C", then determine a value for "set intensity" by multiplying that current intensity by 0.8. "Set intensity" to the determined value can thus be a specific state change that is generated based on the relative state change of the locally interpretable semantic representation.

Further, the assistant client device can generate control command(s) based on the value for "set intensity", and optionally utilizing one or more local adapter(s). The control command(s) can be generated to conform to a protocol suite that conforms to "light C", such as a BLE, Z-Wave, Zigbee, Wi-Fi, or other protocol suite. The protocol suite to utilize in generating the control command(s) can be selected based on the identifier of the smart device included in the locally interpretable semantic representation and/or based on an indication of the adapter that can be included in the locally interpretable semantic representation.

Yet further, the generated control command(s) can be locally transmitted to a "light C" (or a corresponding local device controlling "light C"). The control command(s) can be transmitted to "light C" (or corresponding local device) based on the locally interpretable semantic representation identifying "light C" (e.g., identifying an address of "light C"), and can be transmitted via a local channel that is optionally identified via the locally interpretable semantic representation. The local channel can be, for example, a Wi-Fi radio channel, a BLUETOOTH radio channel, or other channel. Accordingly, a state change can be effectuated at "light C" without needing to again transmit any data to the remote assistant system and/or without the remote assistant system needing to again generate a semantic representation. This can conserve network resources through obviating the need to send audio data and/or recognized text to the remote assistant system, and can conserve processing resources at the remote assistant system through obviating the need to again generate a semantic representation at the remote system. Further, bypassing the transmission to the remote assistant system and the processing at the remote assistant system can significantly reduce latency in implementation of the requested state change at the smart device.

As mentioned above, various implementations utilize an adapter to locally interpret the locally interpretable semantic representation, or specific state changes generated thereon, to corresponding control command(s). In those implementations, a client device can include one or more adapters, each of which can be tailored to particular smart device(s), to particular smart device manufacturer(s), and/or to a particular protocol suite. An adapter, when executed by the assistant client device, can process a locally interpretable semantic representation (and/or specific state changes generated based on the locally interpretable semantic representation) to generate specific control commands that are each tailored, when locally transmitted to at least one corresponding smart device (or a hub/bridge or other component connected to the smart device), to be directly interpretable by the corresponding smart device (or other component connected to the smart device) to effectuate a state change at the corresponding smart device. For example, an adapter can be implemented by JavaScript (or other interpreted programming language) and can translate generic smart device control commands, generated based on a locally interpretable semantic representations, into specific control commands that conform to a protocol suite of a smart device. The adapter can optionally execute in a container within the automated assistant client. In implementations where multiple adapters are available at an assistant client device, a particular adapter can be selected for a locally interpretable semantic representation based on the identifier of the smart device included in the semantic representation and/or based on an indication of the adapter that can be included in the semantic representation.

In implementations where the cache entry also includes text, audio data, and/or graphic(s) that confirm the alteration to the state of "lights A & B", the assistant client device can also render such content in response to determining the cache entry matches the input. The content can be rendered immediately, or optionally after a delay.

It is noted that, in the preceding example, the smart device control request is a state-relative state change request. That is, it requests a change to the state(s) of the smart device(s) in manner that is dependent on the current state(s) of the smart device(s). More particularly, it requests a change to the brightness state of light C in a manner that is relative to the current brightness state of light C. In some implementations, the remote assistant system can determine to provide a cache request that includes locally interpretable semantic representation(s), in lieu of local control command(s), responsive to determining the semantic representation(s) are relative state change representation(s). Such determination can be determined based on the semantic representation(s) referencing current state(s) of the smart device(s).

In some of those implementations, the remote assistant system can provide a cache request that includes local control command(s), in lieu of semantic representation(s), responsive to determining the semantic representation(s) are not relative state change representations. For example, assume instead a spoken utterance of "set the light to 500 lumens". In such an example, a locally interpretable semantic representation that identifies "light C" and that identifies a "target brightness intensity level" of "500 lumens" for that light can be generated. Further, a corresponding control request can also be generated. Since the semantic representation is not relative, the remote assistant system can optionally transmit a cache request that includes local control command(s), generated based on the locally interpretable semantic representation. In response, the client device can generate a cache entry that maps the text "set the light to 500 lumens" (or a representation thereof) to the control command(s). Thereafter, in response to determining received input matches the text of the cache entry, the client device can locally transmit the control command(s) of the cache entry, thereby bypassing generating of the control command(s) based on a locally interpretable semantic representation.

It is also noted that, similar to the cloud semantic representations, amongst assistant client devices of an ecosystem of a user/account, that certain cache entries can include mappings of the same text to different locally interpretable semantic representations (or local control command(s)).

Separate examples are provided above of cloud semantic representations and locally interpretable semantic representations. However, in some implementations a single cache entry can include a mapping of text to both a locally interpretable semantic representation and a cloud semantic representation. For example, lights "A" and "B" can both be identified for a request, and light "A" may be locally controllable, but light "B" may be only controllable via cloud control. As a result, the remote assistant system can generate provide a cache request that causes text for the request to be mapped to both: (a) a locally interpretable semantic representation that can be locally processed to effectuate a state change at "light A"; and (b) a cloud semantic representation that is transmitted to the remote assistant system for effectuating a state change at "light B".

In various implementations, the remote assistant system and/or the client devices can determine alteration(s) to the device topology for an account and/or the occurrence of other condition(s) and, as a result, cause one or more cache entries of cache(s) of the client device(s) of the ecosystem to be cleared (e.g., fully removed, or flagged as stale). The alteration(s) to the device topology can include, for example: addition or removal of smart device(s) in the device topology, renaming of smart device(s) and/or of assistant client device(s) in the device topology, assigning of device(s) to new room(s) and/or group(s) in the device topology, and/or other change(s) to the device topology. Such alterations can affect some or all semantic representation(s) of the cache and, as a result, at least the affected cache entries (and optionally all the cache entries) can be cleared from the cache in response to detecting alteration(s). As one example, assume that an additional light is added to the device topology and is assigned to a room having a "kitchen" label. When that addition is made, any semantic cache entries related to those lights that were previously assigned to the "kitchen lights" would now be stale since they would not reflect the newly added additional light. Accordingly, responsive to detecting the change, at least those cache entries relating to "kitchen lights" can be cleared from the cache. For example, the remote assistant system can determine such a change and, as a result, send cache clearing requests to all assistant devices of the ecosystem to cause the local caches of all the assistant client devices to be cleared. New cache entries will thereafter be generated at the assistant client devices as spoken utterances, typed inputs, or other inputs are received. For example, if a cache entry for text of "dim the kitchen lights" is cleared, a new cache entry will be created if a user thereafter provides a spoken utterance of "dim the kitchen lights".

In some implementations, an assistant client device can at least selectively process audio data, utilizing an on-device speech-to-text model, without any detection of an explicit automated assistant invocation at the assistant client device. An explicit invocation cue is one that, when detected in isolation, will always cause at least on-device speech recognition to be activated. Some non-limiting examples of explicit invocation cues include detecting a spoken hot-word with at least a threshold degree of confidence, an actuation of an explicit assistant interface element (e.g., hardware button or graphical button on a touch-screen display), a "phone squeeze" with at least threshold strength (e.g., as detected by sensor(s) in a bezel of a mobile phone), and/or other explicit invocation cue(s).

As one example, the assistant client device can process audio data, without any detection of an explicit automated assistant invocation, when human presence is detected near the device (e.g., based on a passive infrared sensor and/or other sensor), in response to detecting any voice activity (e.g., using a voice activity detector), in response to detecting at least a threshold level of noise near the device, during certain days and/or times, and/or in response to other condition(s). In implementations where the assistant client device is processing audio data, utilizing an on-device speech-to-text model, without any detection of an explicit automated assistant invocation, the assistant client device can determine whether any recognized text matches any "hot phrase" indicated as such locally on the assistant client device. Each "hot phrase" comprises a sequence one or more word. When recognized text, from on on-device speech recognition of audio data, is determined to not match a hot phrase, the assistant client device can discard such recognized text and audio data. When recognized text, from on on-device speech recognition of audio data, is determined to match a hot phrase, the assistant client device can automatically initiate one or more corresponding action(s) based on the text. A user can be provided with control over which phrases are indicated as hot phrases and, optionally, explicit user acceptance can be required before a phrase is indicated as a hot phrase.

In some implementations, a hot phrase can be one that matches text of a corresponding cache entry described herein. In those implementations, the action(s) that are initiated automatically by the assistant client device based on the hot phrase can include transmitting of the corresponding cloud semantic representation or local interpretation of the corresponding locally interpretable semantic representation. In some of those implementations, the text of a cache entry can be designated, at an assistant client device, as a hot phrase for that assistant client device based on determining one or more criteria are satisfied. The criteria can include, for example, that the text and/or matching text have been determined to be present in user input (e.g., typed and/or spoken) received at the assistant client device at least a threshold quantity of times (overall or within a recent temporal duration) and/or with at least a threshold frequency (overall or within a recent temporal duration). In some versions of those implementations, the text of the cache entry can be automatically designated as a hot phrase, optionally with a confirmation of such designation provided via user interface input (e.g., "by the way, I've designated X as a hot phrase. You can easily change this in your settings"). In some other versions, the text may be designated as a hot phrase only after confirmatory user input in response to a prompt. For example, confirmatory input of "yes" in response to a prompt of "you ask to 'turn on the lights often', want me to designate it as a hot phrase so you no longer have to say 'OK assistant' first?". In yet other implementations, text of any local cache entries in a cache of an assistant client device can be automatically designated as hot phrase for the assistant client device. In implementations that designate text of a cache entry as a hot phrase, user interaction with the assistant client device can be shortened in duration, by obviating the need for the user to first provide an explicit invocation such as an invocation hot word (e.g., "OK Assistant"). Through shortening of the duration of interactions with the assistant client device, the human-assistant client device interaction is improved, enabling a greater quantity of smart device state alterations to be effectuated in a shorter duration of time.

The above description is provided as an overview of only some implementations of the present disclosure. Further description of those implementations, and other implementations, are described in more detail herein.

In addition, some implementations include one or more processors of one or more computing devices, where the one or more processors are operable to execute instructions stored in associated memory, and where the instructions are configured to cause performance of any of the methods described herein. Some implementations include a client device with one or more processors executing locally stored instructions and interfacing with locally stored data to perform one or more of the methods described herein. Some implementations also include one or more computer readable storage media (transitory or non-transitory) storing computer instructions executable by one or more processors to perform any of the methods described herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
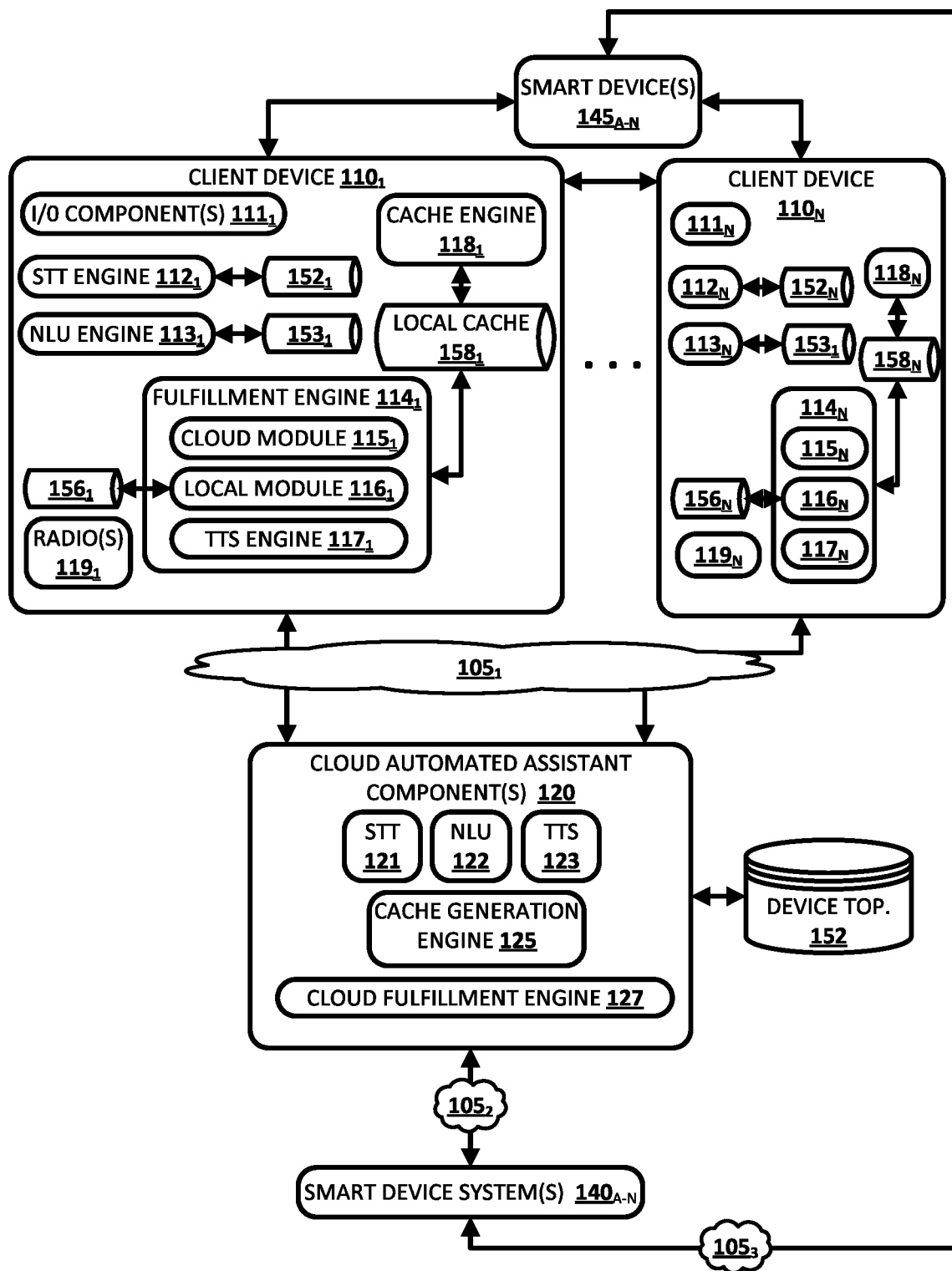
FIG. 1 is a block diagram of an example environment in which implementations disclosed herein may be implemented.

There is a proliferation of smart network connected devices (also referred to herein as smart devices or Internet of Things (IoT) devices) such as smart home alarms, smart door locks, smart cameras, smart lights, smart thermostats, smart weight scales, smart beds, smart irrigation systems, smart garage door openers, smart plugs, smart appliances, smart baby monitors, smart televisions (TVs), smart fire alarms, smart moisture detectors, smart routers, etc. Often, multiple smart devices are located within the confines of a structure, such as a home—or located within multiple related structures, such as a user's primary residence and the user's secondary residence and/or work location.

Further, there is a proliferation of assistant client devices that can each include an assistant client that can optionally interact with one or more remote automated assistant components to form a logical instance of an automated assistant. An assistant client device can be devoted solely to assistant functionality (e.g., a standalone speaker and/or standalone audio/visual device including only an assistant client and associated interface, and devoted solely to assistant functionality) or can perform assistant functionality in addition to other functions (e.g., a mobile phone or tablet that includes an assistant client as one of multiple applications). Moreover, some smart devices can also be assistant client devices. For example, some smart devices can include an assistant client and at least speaker(s) and/or microphone(s) that serve (at least in part) as user interface output and/or input devices for an assistant interface of the assistant client.

Various techniques have been proposed for associating smart devices with corresponding logical instances of automated assistants (and optionally with individual assistant client devices). For example, a user, group of users, an assistant client device, and/or a group of assistant client devices (e.g., all within a structure) can be linked (e.g., in one or more databases) with a plurality of disparate smart devices to enable interaction with (e.g., control of) the smart devices via automated assistants. For instance, each of multiple assistant client devices in a household can be linked to each of multiple disparate smart devices in the household to enable any user (or a restricted group of users) to interface with any one of the assistant client devices to interact with any one of the multiple disparate smart devices.

Such linkings of smart devices and assistant client devices is referred to herein as a device topology and can be represented by various data structures. A device topology can be user created, and/or automatically created, and can define various assistant client devices, various smart devices, identifier(s) for each, and/or attribute(s) for each. For example, the identifier(s) for a device can specify a room (and/or other area(s)) of a structure in which the device is located (e.g., living room, kitchen) and/or can specify nickname(s) and/or alias(es) for the device (e.g. couch lamp, front door lock, bedroom speaker, kitchen assistant, etc.). In this manner, the identifiers of devices can be names, aliases, and/or locations of the respective devices that the user is likely to associate with the respective devices.

The device topology representation can further specify one or more device attributes associated with the respective devices. The device attributes for an assistant client device can include, for example, one or more input and/or output modalities supported by the assistant client device and/or preferred smart device(s) to be controlled by assistant client device(s) (e.g., ambiguous smart TV commands received at assistant client device 1 should be assumed to be directed to smart TV 1, whereas they can be assumed to be directed to smart TV 2 for assistant client device 2). For instance, a device attribute for a standalone speaker-only assistant client device can indicate that it is capable of providing audible output, but incapable of providing visual output. Also, for instance, a device attribute for the same standalone speaker-only assistant client device can indicate that lighting control requests that don't specify particular light(s), should be interpreted to pertain to the light(s) assigned to the same room as that assistant client device. The device attributes of a smart device can, for example, identify one or more states, of the smart device, that can be controlled; identify a party (e.g., a 3P) that manufactures, distributes, and/or creates the firmware for the smart device; and/or identify a unique identifier for the smart device, such as an address of the smart device and/or a 1P or 3P provided fixed identifier. According to various implementations disclosed herein, the device topology representation can optionally further specify: which smart devices can be controlled locally by which assistant client devices; local addresses for locally controllable smart devices (or local addresses for hubs that can directly locally control those smart devices); local signal strengths and/or other preference indicators between assistant client devices and smart devices. Further, according to various implementations disclosed herein, the device topology representation (or a variation thereof) can be stored remotely at a remote assistant system and/or locally stored at each of a plurality of assistant client devices for utilization in locally controlling smart devices. Optionally, each locally stored device topology may be less robust (e.g., define less devices, attributes, and/or identifiers) than the remotely stored device topology due to, for example, assistant client device hardware constraints.

Now turning to FIG. 1, an example environment in which techniques disclosed herein may be implemented is illustrated. The example environment includes a plurality of assistant client devices $110_{1-N}$ (also referred to herein simply as "client devices"), cloud automated assistant component(s) 120, smart device systems $140_{A-N}$, smart devices $145_{A-N}$, and a device topology 152 for the client devices $110_{1-N}$. The client devices $110_{1-N}$ and smart devices $145_{1-N}$ of FIG. 1 represent client devices and smart devices that are at least selectively associated with one another (e.g., via the device topology 152). For example, the smart devices $145_{1-N}$ can all be at a home (e.g., in the interior and/or exterior of the home), the client devices $110_{1-N}$ can be at least occasionally in the same home, and the smart devices $145_{1-N}$ and the client devices $110_{1-N}$ can be linked to one another utilizing one or more techniques, such as those described herein. Through such linking, the client devices $110_{1-N}$ can be utilized to control the smart devices $145_{1-N}$ according to implementations described herein.

One or more (e.g., all) of the client devices $110_{1-N}$ can execute a respective instance of an automated assistant client. However, in some implementations one or more of the client devices $110_{1-N}$ can optionally lack an instance of an automated assistant client and still include engine(s) and hardware components for controlling or more smart devices. An instance of the automated assistant client can be an application that is separate from an operating system of the corresponding client device $110_{1-N}$ (e.g., installed "on top" of the operating system)—or can alternatively be implemented directly by the operating system of the corresponding client device $110_{1-N}$. Each instance of the automated assistant client can optionally interact with cloud automated assistant component(s) 120 in responding to various requests provided by a user via I/O components 111 of any one of the client devices $110_{1-N}$. Further, other engine(s) of the client devices $110_{1-N}$ can optionally interact with cloud automated assistant component(s) 120.

One or more (e.g., all) of the client devices $110_{1-N}$ can include a respective speech-to-text (STT) engine $112_{1-N}$ that utilize respective locally stored STT models $152_{1-N}$ to process audio data that captures spoken utterances, to generate corresponding recognized text for the spoken utterances. Each instance of audio data can be detected via microphone(s) of I/O component(s) $111_{1-N}$ of a respective client device. In some implementations, the STT engines $112_{1-N}$ only process audio data following an explicit automated assistant invocation detected at a corresponding client device $110_{1-N}$. In some implementations, the STT engines $112_{1-N}$ can at least selectively process audio data, even absent an explicit automated assistant invocation, but discard (without further processing) any audio data and/or recognized text determined not to include any "hot phrase" as described herein. In situations where a "hot phrase" is detected, one or more responsive action(s) can be taken based on the "hot phrase". For example, where the "hot phrase" matches text of a cache entry, of a corresponding local cache $158_{1-N}$, semantic representation(s) of the cache entry can be further processed as described herein.

One or more (e.g., all) of the client devices $110_{1-N}$ can also optionally include a respective natural language understanding (NLU) engine $113_{1-N}$ that utilize respective locally stored NLU models $153_{1-N}$ to process text, to attempt to locally generate a local semantic representation of the text. The text can be recognized text from STT engine 112, or can be typed text (e.g., input via a virtual keyboard of a touchscreen), or can be text that is associated with a selected virtual and/or hardware button (e.g., text that is mapped to selection of a particular virtual button displayed on a touch screen). The NLU engines $113_{1-N}$ may be able to generate valid semantic representations for various textual phrases. However, as described herein, the NLU engines $113_{1-N}$ may also fail to generate valid semantic representations for various other textual phrases such as, for example, various textual phrases that relate to control of smart device(s) (e.g., relative control of smart device(s)).

One or more (e.g., all) of the client devices $110_{1-N}$ can also include respective fulfillment engine $114_{1-N}$. Each fulfillment engine $114_{1-N}$ can include a respective cloud module $115_{1-N}$, a respective local module $116_{1-N}$, and/or a respective text-to-speech (US) engine $117_{1-N}$.

The cloud modules $115_{1-N}$ can fulfill various requests through interaction with cloud automated assistant component(s) 120. For example, cloud module $115_1$ can, responsive to determining text of received input (e.g., recognized text STT engine $112_{1-N}$) matches text of a cache entry of local cache $158_1$, transmit a cloud semantic representation(s), mapped to the text in the cache entry, to cloud automated assistant component(s) 120 as described herein. Cloud module $115_1$ can also optionally transmit cloud semantic representations, generated by NLU engine $113_1$, to cloud automated assistant component(s) 120. Cloud fulfillment engine 127, of cloud automated assistant component(s) 120, can then utilize the received cloud semantic representation(s) in fulfilling the received input. For example, for smart device control inputs, the cloud fulfillment engine 127 can utilize the cloud semantic representation to generate corresponding control request(s), to transmit to corresponding smart device system(s) $140_{A-N}$, which then generate and transmit corresponding control command(s) to corresponding smart device(s) $145_{A-N}$.

The cloud modules $115_{1-N}$ can also, for received input(s) that are not resolvable with a respective NLU engine $113_{1-N}$ and/or that do not match any cache entries of a respective local cache $158_{1-N}$, transmit data representative of the received input(s) to cloud based automated assistant component(s) 120. For example, if the received input is a spoken utterance captured in audio data, the audio data and/or local recognized text therefor (e.g., from a respective STT engine $112_{1-N}$) can be transmitted to the cloud based automated assistant component(s) 120. For at least some of those transmission(s), the cloud-based component(s) 120 can provide, in response, cache request(s) to a respective cache engine $118_{1-N}$, to enable future occurrences of the input(s) to be fulfilled more efficiently and/or with reduced latency. Further, the cloud-based component(s) 120 can additionally or alternatively, responsive to the received input(s), perform a corresponding cloud fulfillment and/or provide locally interpretable semantic representations and/or local command(s) to a respective client device $110_{1-N}$ for utilization by the respective client device $110_{1-N}$ in performing a local fulfillment.

The local modules $116_{1-N}$ can fulfill various requests locally and without interaction with cloud automated assistant component(s) 120. For example, local module $116_1$ can, responsive to determining text of received input (e.g., recognized text from STT engine $112_{1-N}$) matches text of a cache entry of local cache $158_1$, utilize locally interpretable semantic representation(s), mapped to the text in the cache entry, in locally fulfilling a request. For instance, the local module $116_1$ can utilize the locally interpretable semantic representation(s) in generating local control command(s) to locally transmit to one or more corresponding smart devices $145_{A-N}$ over respective ones of the radio(s) $119_1$. Optionally, and as described herein, when the locally interpretable semantic representation(s) are for smart device control, the local modules $116_{1-N}$ can utilize one or more respective adapter(s) $156_{1-N}$ in generating the local control command(s). Local module $116_1$ can also optionally locally interpret any locally interpretable semantic representations generated by NLU engine $113_1$.

Text-to-speech (US) engines $117_{1-N}$ can optionally be utilized to generate synthesized speech for providing responsive to requests. For example, TTS engine $117_1$ can, responsive to determining text of received input (e.g., recognized text from SU engine $112_{1-N}$) matches text of a cache entry of local cache $158_1$, utilize responsive text, mapped to the text in the cache entry, to generate corresponding synthesized speech and cause the synthesized speech to be rendered response to the received input. The synthesized speech can be rendered in addition to other action(s) performed based on semantic representation(s) (cloud and/or locally interpretable) also mapped to the text in the cache entry. Further, the responsive text can additionally or alternatively be visually rendered and/or alternative content can additionally or alternatively be rendered by the fulfillment engine responsive to it being mapped to the text in the cache entry.

One or more (e.g., all) of the client devices $110_{1-N}$ can also optionally include a respective cache engine $118_{1-N}$ and a respective local cache $158_{1-N}$, mentioned above. The cache engines $118_{1-N}$ can each receive respective cache requests from cache generation engine 125 of cloud automated assistant component(s) 120, and store respective cache entries in a respective local cache $158_{1-N}$. The local caches $158_{1-N}$ can be stored in, for example, RAM and/or ROM of the respective client devices $110_{1-N}$. As described herein, in some implementations a received cache request, from cache generation engine 125 includes the entirety of the cache entry to be stored in a respective local cache $158_{1-N}$. In other implementations, the cache request may lack the text to include in a cache entry and map to semantic representation(s) in the cache entry. In such implementations, a respective cache engine $118_{1-N}$ can determine the text based on it being the text most recently provided to the cloud automated assistant component(s) 120 (or recognized text for audio data most recently provided to the cloud automated assistant component(s) 120.

The cloud automated assistant component(s) 120 can be implemented on one or more computing systems (collectively referred to as a "cloud" or a "remote" assistant system) that are communicatively coupled to client devices $110_{1-N}$ via one or more wide area networks (e.g., the Internet), indicated generally by $105_1$ of FIG. 1. For example, cloud automated assistant component(s) 120 can be implemented by one or more clusters of high-performance servers. It is noted that the client devices $110_{1-N}$ can utilize one or more local area networks in accessing the wide-area networks $105_1$ and/or in locally communicating with one another. Such local area networks can include a Wi-Fi network and/or a mesh network between the client devices $110_{1-N}$.

The cloud automated assistant components 120 can also be communicatively coupled with smart device systems $140_{A-N}$ via one or more wide area networks. The communicative coupling of the cloud automated assistant components 120 with the smart device systems 140 is indicated generally by $105_2$ of FIG. 1. Further, the smart device systems 140 can each be communicatively coupled to a corresponding group of one or more smart devices $145_{A-N}$ via one or more wide area networks, generally indicated generally by $110_4$ of FIG. 1. It is noted that the smart devices $145_{A-N}$ can utilize one or more local area networks in accessing the wide-area networks $105_3$.

Each of the smart device systems $140_{A-N}$ can be either a first party (1P—i.e., manufactured and/or distributed by the same party that controls the automated assistant) or a third party (3P—i.e., manufactured and/or distributed by a different party) system, and each can be communicatively coupled with one or more corresponding smart devices $145_{A-N}$. For example, a first smart device system $140_{A-N}$ can be controlled by a first 3P and communicatively coupled with a first smart device $145_{A1}$, a second smart device system 140 can be controlled by a second 3P and communicatively coupled with a second smart device $145_{B1}$ and a third smart device $145_{B2}$, etc.

The smart device systems $140_{A-N}$ can communicate with the devices $145_{A-N}$ via the wide-area networks $105_3$ to control their respective smart devices $145_{A-N}$, to deliver firmware updates to their respective smart devices $145_{A-N}$, to ascertain the status of their respective smart devices $145_{A-N}$, etc. For example, a given one of the smart device systems 140 can communicate with one of the smart devices $145_{A-N}$ to control the smart device in response to user input being received via a mobile application, for the smart device system, that enables control of the smart device.

Also, for example, a given one of the smart device systems 140 can communicate with one of the smart devices $145_{A-N}$ to control the smart device in response to a request from cloud automated assistant component(s) 120. For example, according to some techniques a user can provide, via one or more I/O components $111_1$ of a client device $110_1$, a request to control a smart device, such as spoken input of "turn off the couch light" provided via microphone(s) of I/O components $111_1$. The request (e.g., audio data that captures the spoken input, or locally generated text) can be transmitted by the client device $110_1$ to the cloud automated assistant component(s) 120 via the wide-area networks $105_1$. The cloud automated assistant component(s) 120 can process the request to determine a smart device to be controlled based on the request, and transmit, via the wide-area networks $105_2$, a control request to a respective one of the smart device systems $140_{A-N}$ which, in turn transmits, via wide-area networks $105_3$, corresponding command(s) to the smart device. However, as described herein such techniques present drawbacks such as high latency and/or excessive consumption of network resources.

In some implementations, the plurality of client computing devices $110_{1-N}$ and smart devices $145_{A-N}$ can be associated with each other in various ways in order to facilitate performance of techniques described herein. For example, in some implementations, the plurality of client devices $110_{1-N}$ and smart devices $145_{A-N}$ may be associated with each other by virtue of being communicatively coupled via one or more LANs and/or via one or more peer-to-peer networks. This may be the case, for instance, where plurality of client computing devices $110_{1-N}$ are deployed across a particular area or environment, such as a home, a building, and so forth. Additionally or alternatively, in some implementations, plurality of client devices $110_{1-N}$ and smart devices $145_{A-N}$ may be associated with each other by virtue of them being members of a coordinated ecosystem of client devices $110_{1-N}$ and smart devices $145_{A-N}$ that are at least selectively accessible by one or more users (e.g., an individual, a family, employees of an organization, other predefined groups, etc.). In some of those implementations, the ecosystem of client devices $110_{1-N}$ and smart devices $145_{1-N}$ can be manually and/or automatically associated with each other in the device topology 152.

An instance of an automated assistant client of a client device $110_{1-N}$, by way of its interactions with one or more cloud automated assistant components 120, may form what appears to be, from a user's perspective, a logical instance of an automated assistant with which the user may engage in a human-to-computer dialog. For example, a user can engage with the same logical instance of an automated assistant using either client device $110_1$ and automated assistant client $117_1$ or using client device $110_N$ and automated assistant client $117_N$. While the particular instances of the automated assistant client $117_1$ and $117_N$ can vary (e.g., provide different smart device control for the same commands) and/or can provide user interface output via different I/O components $111_1$ and $111_N$ and/or accept different user interface input via different I/O components $111_1$ and $111_N$ (e.g., I/O components $111_1$ can include a touch-screen, while I/O components $111_N$ do not), the user may still effectively engage with the same logical instance of the automated assistant. For the sakes of brevity and simplicity, the term "automated assistant", as used herein will refer to the automated assistant client executing on a client device 110 and optionally to one or more cloud automated assistant components 120 (which may be shared amongst multiple automated assistant clients). Although two client devices $110_1$ and $110_N$ of a coordinated ecosystem are illustrated in FIG. 1, it is understood that many additional client devices can be included in the ecosystem. Further, it is understood that separate coordinated ecosystems of client devices will also be provided, each associated with different user(s) (e.g., account(s)) and/or environments, and that such separate coordinated ecosystems can also interact with cloud automated assistant component(s) 120 (but with interactions tailored to the account(s) of those separate ecosystems).

The client devices $110_{1-N}$ may include, for example, one or more of: a desktop computing device, a laptop computing device, a tablet computing device, a mobile phone computing device, a computing device of a vehicle of the user (e.g., an in-vehicle communications system, an in-vehicle entertainment system, an in-vehicle navigation system), a standalone assistant-centric interactive speaker, a standalone assistant-centric interactive display with speaker(s), a smart appliance such as a smart television, and/or a wearable apparatus of the user that includes a computing device (e.g., a watch of the user having a computing device, glasses of the user having a computing device, a virtual or augmented reality computing device). Additional and/or alternative client computing devices may be provided.

As mentioned above, one or more of the client devices $110_{1-N}$ can at least selectively interface with the cloud automated assistant component(s) 120 in processing inputs and/or in generating outputs based on the inputs and/or in generating smart device control commands based on the inputs. The cloud automated assistant component(s) 120 can include a STT engine 121, an NLU engine 122, a TTS engine 123, a cache generation engine 125, and/or a cloud fulfillment engine 127.

As described above, for a received request, at a client device $110_{1-N}$, that are not resolvable by a respective NLU engine $113_{1-N}$ and/or that lack a matching cache entry in a respective local cache $158_{1-N}$, text and/or audio data corresponding to the request can be transmitted to the cloud automated assistant component(s) 120. The cloud automated assistant component(s) 120 can utilize its more robust NLU engine 122 to generate semantic representation(s) based on processing text for the request. The processed text can be transmitted by the client device, or can be recognized text generated by STT engine 121 utilizing audio data transmitted by the client device. The generated semantic representation(s) can include cloud semantic representation(s) and/or locally interpretable semantic representation(s) as described herein. As also described herein, in generating the semantic representation(s) the NLU engine 122 can leverage the device topology 152 for the client devices $110_{1-N}$ and smart devices $145_{A-N}$.

The cache generation engine 125 can, responsive to the transmission from one of the client devices $110_{1-N}$, generate a cache request that includes a cache entry that includes the generated semantic representation(s), and optionally includes the text (or representation thereof) and a mapping of the text to the semantic representation(s). The cache entry of the generated cache request can include additional and/or alternative content, such as responsive content to be rendered, protocol suites, adapters, and/or radio(s) to be utilized with locally interpretable semantic representation(s), and/or other content. The responsive content to be rendered can include, text, audio data (e.g., synthesized speech for responsive text, generated using TTS engine 123), and/or graphics. The cache generation engine 125 transmits a corresponding cache request to the respective cache engine $118_{1-N}$ of the respective client device $110_{1-N}$ to cause storage of the cache entry in a respective local cache $158_{1-N}$.

When the generated semantic representation(s) include cloud semantic representation(s), the cloud fulfillment engine 127 can process the cloud semantic representation(s) to generate corresponding control request(s), that it then transmit(s) to corresponding smart device system(s) $140_{A-N}$. The smart device systems $140_{A-N}$ can, responsive to the control request(s), generate and transmit corresponding control commands to corresponding smart device(s) $145_{A-N}$.

When the generated semantic representation(s) include locally interpretable semantic representation(s), the respective client device $110_{A-N}$ can utilize the locally interpretable semantic interpretation(s) of the cache request in generating corresponding local control commands and locally transmitting those local control commands (e.g., using a respective local module $116_{A-N}$). Alternatively, the cloud automated assistant component(s) 120 can provide the locally interpretable semantic representation(s) in a separate transmission, and the respective client device $110_{A-N}$ can utilize the locally interpretable semantic interpretation(s) of the separate transmission in generating corresponding local control commands and locally transmitting those local control commands (e.g., using a respective local module $116_{A-N}$). As yet another alternative, the cloud automated assistant component(s) 120 can themselves generate the local control command(s), and transmit the local control command(s) to the respective client device $110_{A-N}$ for locally transmitting those control command(s).

As also described above, for a received request, at a client device $110_{1-N}$, that matches a cache entry, in a respective local cache $158_{1-N}$, that includes a cloud semantic representation, the cloud semantic representation can be transmitted to the cloud automated assistant component(s) 120 (e.g., in lieu of corresponding text and/or audio data). The cloud fulfillment engine 127 can process the received cloud semantic representation(s) to generate corresponding control request(s), that it then transmit(s) to corresponding smart device system(s) $140_{A-N}$. The smart device systems $140_{A-N}$ can, responsive to the control request(s), generate and transmit corresponding control commands to corresponding smart device(s) $145_{A-N}$.

Figure 2:
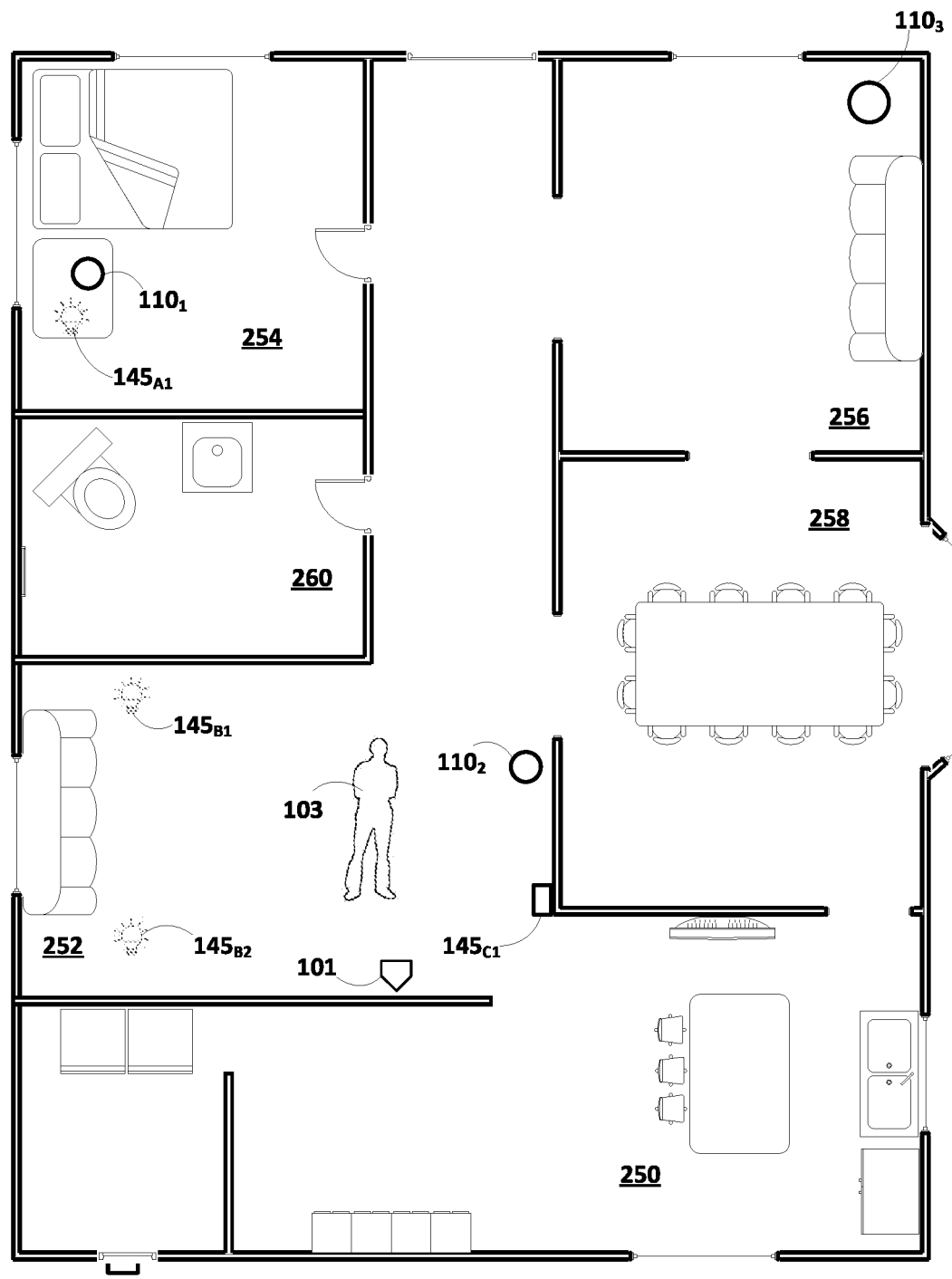
FIG. 2 illustrates an example environment that includes multiple smart devices, from a plurality of disparate parties, and that includes multiple assistant client devices.

Additional description of various components of FIG. 1 is now provided with reference to the additional figures. FIG. 2 depicts a home floorplan that includes a plurality of rooms, 250, 252, 254, 256, 258, 260, and 262. A plurality of client devices $110_{1-3}$ are deployed throughout at least some of the rooms. Each of the client devices $110_{1-3}$ can optionally implement an instance of an automated assistant client configured with selected aspects of the present disclosure and can optionally include one or more input devices, such as microphones, touch-screens, etc. and/or one or more output devices such as speakers, displays, etc. For example, a first client device $110_1$ taking the form of an interactive standalone speaker is deployed in room 254, which in this example is a bedroom. A second client device $110_2$ taking the form of a standalone interactive speaker and display device (e.g., display screen, projector, etc.) is deployed in room 252, which in this example is a living room. A third client device $110_3$, also taking the form of an interactive standalone speaker, is deployed in room 256.

The plurality of client devices $110_{1-3}$ may be communicatively coupled with each other and/or other resources (e.g., smart devices and the Internet) via a wireless router 101, depicted in room 252, and/or a local mesh network. Additionally, other client devices—particularly mobile devices such as smart phones, tablets, laptops, wearable devices, etc.—may also be present, e.g., carried by one or more persons (e.g., user 103) in the home and may or may not also be connected to the same LAN. It should be understood that the configuration of client devices depicted in FIG. 2 is just one example; more or fewer and/or different client devices may be deployed across any number of other rooms and/or areas other than a home.

Further depicted in FIG. 2 are a plurality of smart devices. The smart devices include a smart light $145_{A1}$. The smart light $145_{A1}$ is controllable by a first remote smart device system $140_A$. The smart devices further include smart lights $145_{B1}$ and $145_{B2}$ that are controllable by a second remote smart device system $140_B$. Second remote smart device system $140_B$ can be controlled by a part that is separate from a party that controls first remote smart device system $140_A$. The smart devices further include smart thermostat $145_{C1}$ that is locally controllable, at least by the second client device $110_2$. For example, the smart thermostat $145_{C1}$ can be controlled via control commands that conform to a protocol suite of the smart thermostat $145_{C1}$, and that are provided by the second client device $110_2$ via a Bluetooth connection between the smart thermostat $145_{C1}$ and the second client device $110_3$. It should be understood that the configuration of smart devices 145 depicted in FIG. is just one example; more or fewer and/or different smart devices may be deployed across any number of other rooms and/or areas other than a home.

FIG. 2 and the above description of FIG. 2 will now be utilized in describing various aspects of FIGS. 3A, 3B, 4A, 4B, 5A, and 5B.

Figure 3A:
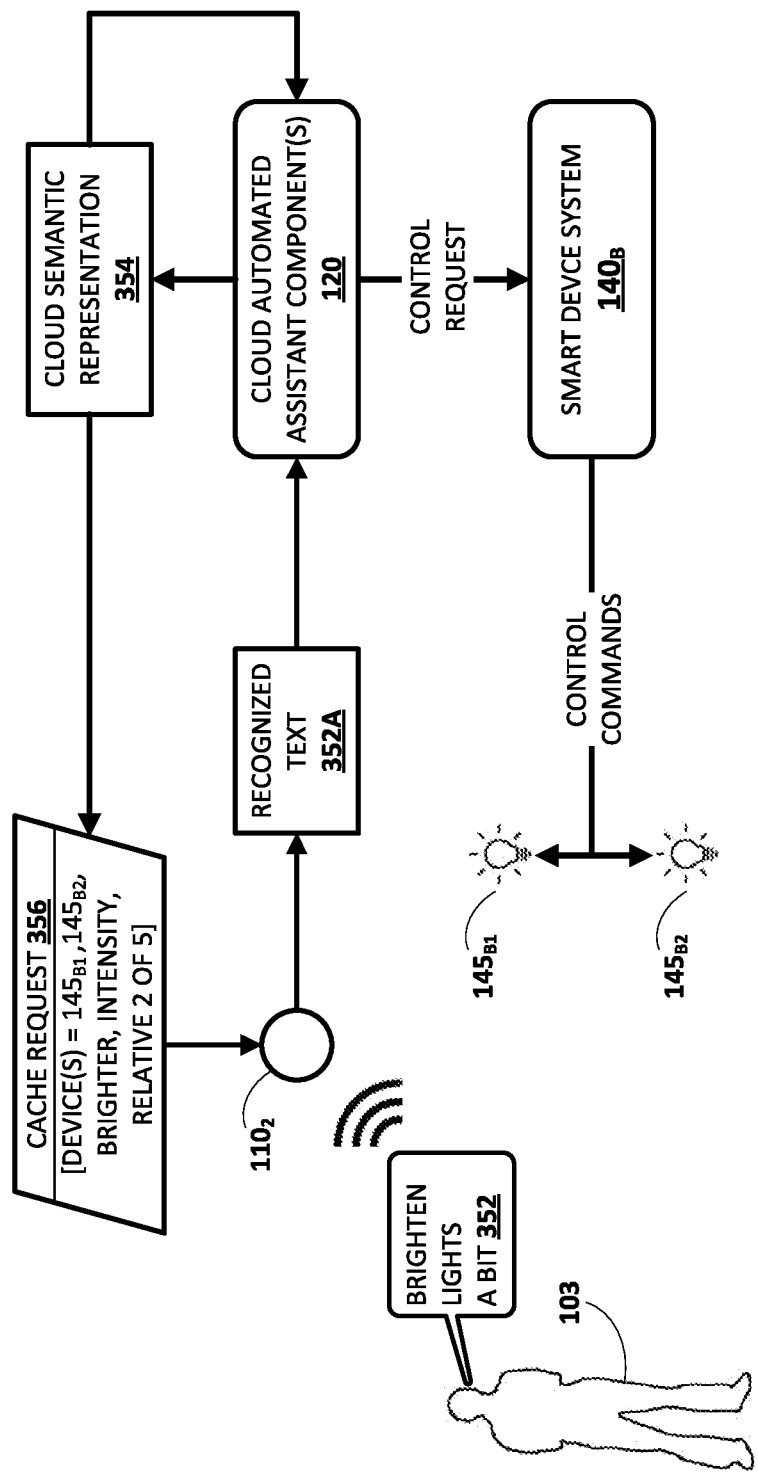
FIG. 3A illustrates an example of how a spoken utterance, received at an assistant client device of FIG. 2, can be processed when that assistant client device lacks a cache entry that matches text of the spoken utterance.

FIG. 3A illustrates an example of how a spoken utterance 352 of "brighten lights a bit", received at the second assistant client device $110_2$ of FIG. 2, can be processed when the second assistant client device $110_2$ lacks a cache entry that matches recognized text 352A of the spoken utterance 352 (where recognized text 352A is generated using an on-device STT engine)—and optionally when a local NLU engine of the second assistant client device $110_2$ is unable to validly process the recognized text 352A. In FIG. 3A, the second assistant client device $110_2$ transmits, to the cloud automated assistant component(s) 120, the recognized text 352A. The transmission of the recognized text 352A can be responsive to the second assistant client device $110_2$ determining it lacks a locally stored cache entry that matches recognized text 352A of the spoken utterance 352—and optionally responsive to a local NLU engine of the second assistant client device $110_2$ failing to validly process the recognized text 352A.

In response to receiving the recognized text 352A, the cloud automated assistant component(s) 120 generate a cloud semantic representation 354 of the recognized text 352A. The cloud semantic representation 354 can be generated based on the recognized text being received from the second assistant client device $110_2$ and based on reference to a remotely stored device topology. In generating the cloud semantic representation, the cloud automated assistant component(s) 120 can resolve "the lights" in the recognized text 352A to particular lights. For example, the cloud automated assistant component(s) 120 can utilize an account identifier, received with the transmission of text 352A, to identify a corresponding remotely stored device topology for the account identifier. Further, the cloud automated assistant component(s) 120 can utilize an identifier of the second assistant client device $110_2$, received with the text 352A, to identify the second assistant client device $110_2$ in the device topology. Yet further, the cloud automated assistant component(s) 120 can resolve "lights", in the text 352A, to lights $145_{B1}$ and $145_{B2}$ based on those lights being mapped, in the device topology, as default lights for the second assistant client device $110_2$. Lights $145_{B1}$ and $145_{B2}$ can be mapped as defaults for the second assistant client device $110_2$ based on prior user interface input and/or based on them all being assigned to an identifier of room 252, in the device topology.

In generating the cloud semantic representation, the cloud automated assistant component(s) 120 can also resolve "brighten . . . a bit" to mean "2 of 5" (e.g., 40%) brighter than current brightness intensity level(s)". This can be based on reference to one or more remotely stored model(s) and/or rule(s) accessible to the cloud automated assistant component(s) 120. The cloud semantic representation 354 can be generated based on these resolutions and can be, for example and as illustrated in cache request 356, [device(s)=$145_{B1}$ and $145_{B2}$; brighter, intensity relative 2 of 5], where "$145_{B1}$ and $145_{B2}$" are unique identifiers for the corresponding lights, and where "brighter, intensity relative 2 of 5" indicates the lights are to be brightened to a degree that is 2 of 5 more relative to their current intensity.

The cloud automated assistant component(s) 120 utilize the generated cloud semantic representation 354 to generate a corresponding control request. The cloud automated assistant component(s) 120 transmit the control request to a smart device system $140_B$ that corresponds to the lights $145_{B1}$ and $145_{B2}$. In response, the smart device system $140_B$ can generate corresponding control commands, and provide those control commands to the lights $145_{B1}$ and $145_{B2}$ to cause them to "brighten a bit" (i.e., increase relative brightness by 40%, as indicated by the cloud semantic representation)

Further, the cloud automated assistant component(s) 120 generate and transmit, to the client device $110_2$, a cache request 356 that includes the cloud semantic representation 354, and that optionally includes the recognized text 352A and/or a mapping of the recognized text to the cloud semantic representation 354. Responsive to receiving the cache request 356, the client device $110_2$ stores a corresponding cache entry that includes a mapping of the recognized text 352A to the cloud semantic representation 354 included in the cache request 356.

Figure 3B:
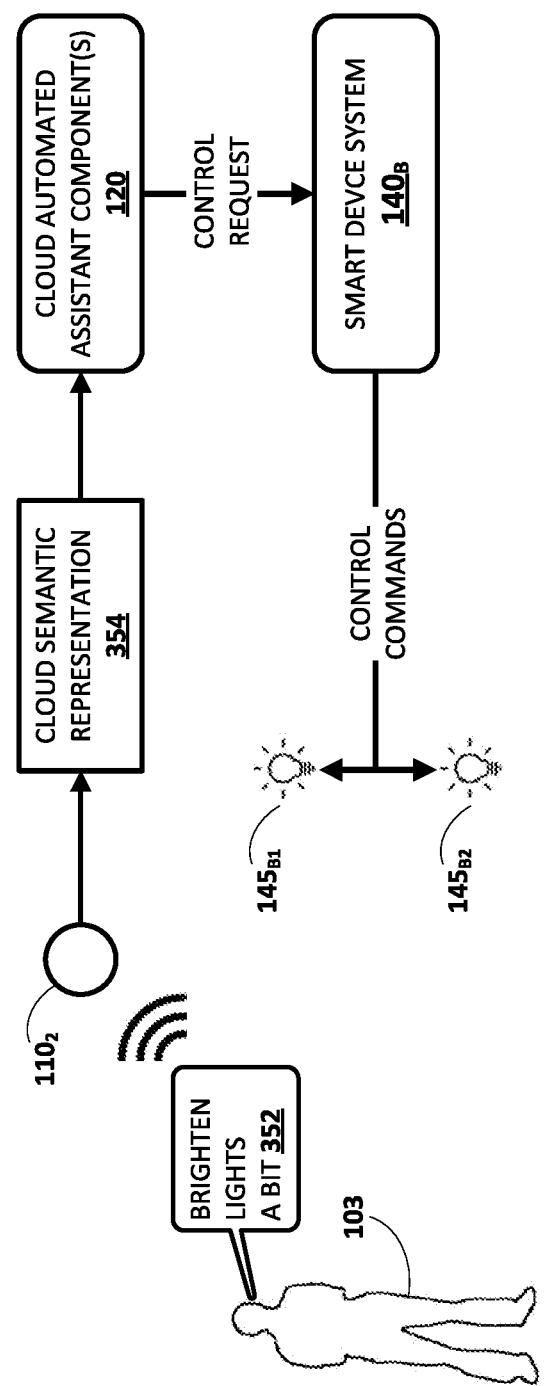
FIG. 3B illustrates an example of how the same spoken utterance of FIG. 3A, received at the same client device of FIG. 3A, can be processed differently after a cache entry with a cloud semantic representation is stored at the assistant client device of FIG. 3A.

FIG. 3B illustrates an example of how another instance of the same spoken utterance 352 of FIG. 3A, also received at the second assistant client device $110_2$, can be processed differently after the cache entry with the cloud semantic representation 354 (FIG. 3A) is stored at the at the second assistant client device $110_2$ in FIG. 3A.

In FIG. 3B, the second assistant client device $110_2$ processes audio data, that captures the spoken utterance 352, to generate recognized text. Further, the second assistant client device $110_2$ determines that the recognized text matches text of the cache entry stored in the local cache of the second assistant client device $110_2$ in FIG. 3A. In response, the second assistant client device $110_2$ transmits, to the cloud automated assistant component(s) 120, the cloud semantic representation of the matching cache entry. The cloud automated assistant component(s) 120 can then process the cloud semantic representation 354 directly, to generate a corresponding control request and transmit the control request to smart device system $140_B$. In response, the smart device system $140_B$ can generate corresponding control commands, and provide those control commands to the lights $145_{B1}$ and $145_{B2}$ to cause them to "brighten a bit". In these and other manners, resources at the cloud automated assistant component(s) can be conserved by preventing another occurrence of generating the cloud semantic representation. Further, the control request can be generated and transmitted more quickly, reducing latency in effectuating the corresponding change to the lights $145_{B1}$ and $145_{B2}$. It is noted that the control request (and as a result, the control commands) of FIG. 3B can vary from that of FIG. 3A, despite being generated based on the same semantic representation. This can be based on the cloud state change of the cloud semantic representation being a relative state change, and the "current" state of the lights $145_{B1}$ and $145_{B2}$, at a time of generating the control request, potentially varying between FIGS. 3A and 3B.

Figure 4A:
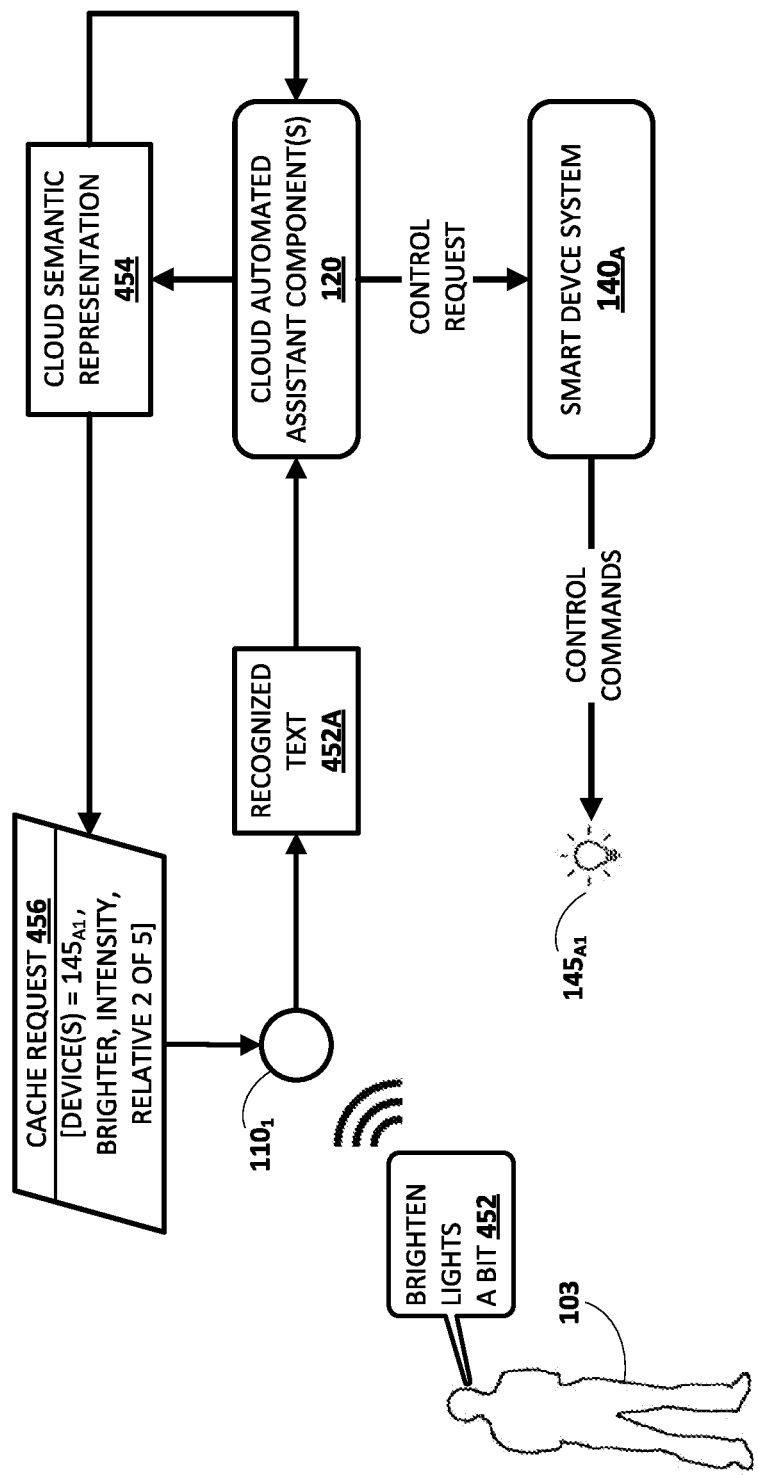
FIG. 4A illustrates an example of how the same spoken utterance of FIG. 3A and FIG. 3B, received at an alternative assistant client device of FIG. 2, can be processed when that alternative assistant client device lacks a cache entry that matches text of the spoken utterance.

FIG. 4A illustrates an example of how the same spoken utterance ("brighten the lights a bit") of FIGS. 3A and 3B, received at first assistant client device $110_2$ of FIG. 2, can be processed when the first assistant client device $110_2$ lacks a cache entry that matches text of the spoken utterance. In FIG. 4A, the user 103 provides the spoken utterance 452 of "brighten the lights a bit"). Although spoken utterance 452 is the same spoken utterance as spoken utterance 352 of FIGS. 3A and 3B, it is labeled as 452 in FIGS. 4A and 4B for numbering consistency.

In FIG. 4A, the first assistant client device $110_1$ transmits, to the cloud automated assistant component(s) 120, recognized text 452A that is generated by processing, using a local STT engine, audio data that captures the spoken utterance 452. The transmission of the recognized text 452A can be responsive to the first assistant client device $110_1$ determining it lacks a locally stored cache entry that matches recognized text 452A of the spoken utterance 452—and optionally responsive to a local NLU engine of the first assistant client device $110_1$ failing to validly process the recognized text 452A.

In response to receiving the recognized text 452A, the cloud automated assistant component(s) 120 generate a cloud semantic representation 454 of the recognized text 452A. The cloud semantic representation 454 can be, for example, and as illustrated in cache request 456, [device(s)=$145_{A1}$; brighter, intensity relative 2 of 5], where "$145_{A1}$" is a unique identifier for the corresponding light, and where "brighter, intensity relative 2 of 5" indicates the lights are to be brightened to a degree that is 2 of 5 more relative to their current intensity. The cloud semantic representation 454 differs from the cloud semantic representation 354 of FIG. 3A in that it includes an identifier of the light $145_{A1}$ in lieu of identifiers of the lights $145_{B1}$ and $145_{B2}$. This can be based on the cloud automated assistant component(s) 120 utilizing an identifier of the first assistant client device $110_1$, received with the text 452A, to identify the first assistant client device $110_1$, and resolving "lights", in the text 452A, to light $145_{A1}$ based on that light being mapped, in the device topology, as a default light for the first assistant client device $110_1$. Accordingly, despite the same spoken utterance being received in FIGS. 3A and 4A, different cloud semantic representations can be generated based at least in part on the spoken utterance being received from different assistant client devices.

The cloud automated assistant component(s) 120 utilize the generated cloud semantic representation 454 to generate a corresponding control request. The cloud automated assistant component(s) 120 transmit the control request to a smart device system 140$_A$ that corresponds to the light 145$_{A1}$ of the semantic representation 454. In response, the smart device system 140$_A$ can generate corresponding control command(s), and provide those control command(s) to the light 145$_{A1}$ to cause it to "brighten a bit".

Further, the cloud automated assistant component(s) 120 generate and transmit, to the first client device 110$_1$, a cache request 456 that includes the cloud semantic representation 454, and that optionally includes the recognized text 452A and/or a mapping of the recognized text to the cloud semantic representation 454. Responsive to receiving the cache request 456, the first client device 110$_1$ stores a corresponding cache entry that includes a mapping of the recognized text 452A to the cloud semantic representation 454 included in the cache request 456.

Figure 4B:
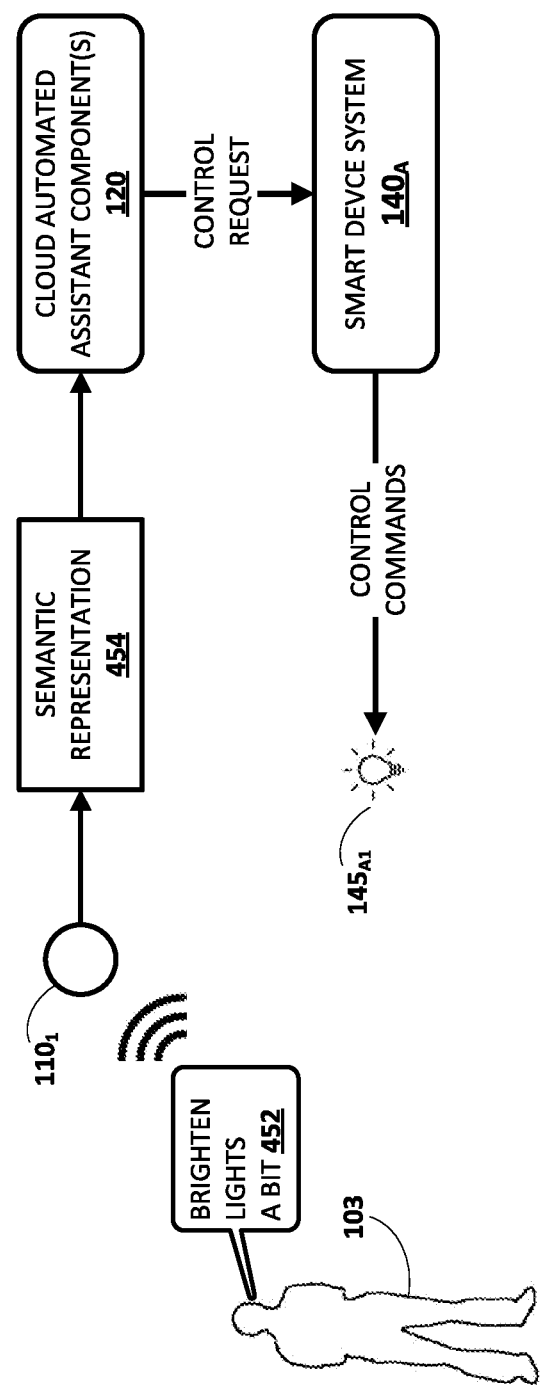
FIG. 4B illustrates an example of how the same spoken utterance of FIG. 4A, received at the alternative client device of FIG. 4A, can be processed differently after a cache entry with a cloud semantic representation is stored at the alternative client device of FIG. 4A.

FIG. 4B illustrates an example of how another instance of the same spoken utterance 452 of FIG. 4A, received at the first assistant client device 110$_1$, can be processed differently after a cache entry with the cloud semantic representation 454 (FIG. 4A) is stored at the first assistant client device 110$_1$ in FIG. 4A.

In FIG. 4B, the first assistant client device 110$_1$ processes audio data, that captures the spoken utterance 452, to generate recognized text. Further, the first assistant client device 110$_1$ determines that the recognized text matches text of the cache entry stored in the local cache of the first assistant client device 110$_1$ in FIG. 4A. In response, the first assistant client device 110$_1$ transmits, to the cloud automated assistant component(s) 120, the cloud semantic representation 454 of the matching cache entry. The cloud automated assistant component(s) 120 can then process the cloud semantic representation 454 directly, to generate a corresponding control request and transmit the control request to smart device system 140$_A$. In response, the smart device system 140$_A$ can generate corresponding control command(s), and provide those control commands to the light 145$_{A1}$ to cause it to "brighten a bit".

Figure 5A:
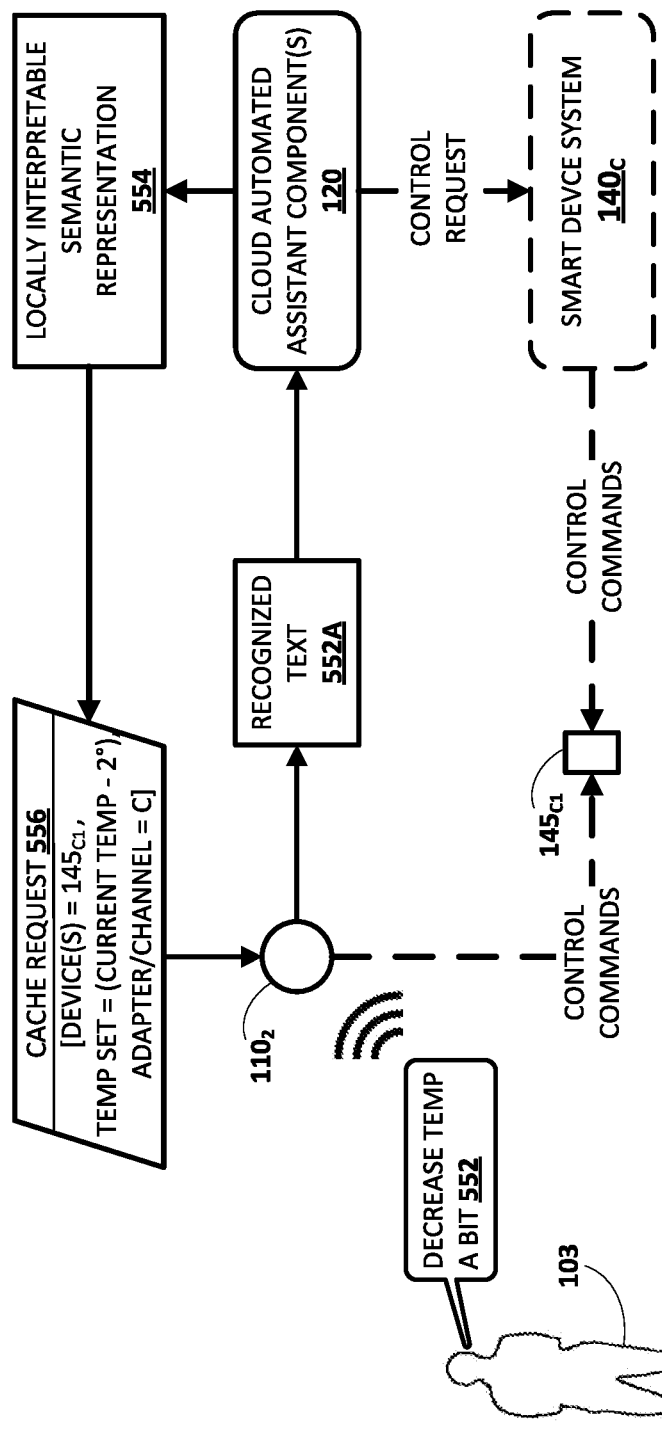
FIG. 5A illustrates an example of how another spoken utterance, received at the same assistant client device of FIGS. 3A and 3B, can be processed when that assistant client device lacks a cache entry that matches text of the spoken utterance.

FIG. 5A illustrates an example of how another spoken utterance 552 of "decrease temp a bit", received at the at the second assistant client device 110$_2$ of FIG. 2, can be processed when the second assistant client device 110$_2$ lacks a cache entry that matches recognized text 552A (generated using an on-device STT engine) of the spoken utterance 552—and optionally when a local NLU engine of the second assistant client device 110$_2$ is unable to validly process the recognized text 452A.

In FIG. 5A, the second assistant client device 110$_2$ transmits, to the cloud automated assistant component(s) 120, the recognized text 552A. The transmission of the recognized text 552A can be responsive to the second assistant client device 110$_2$ determining it lacks a locally stored cache entry that matches recognized text 552A of the spoken utterance 552—and optionally responsive to a local NLU engine of the second assistant client device 110$_2$ failing to validly process the recognized text 552A.

In response to receiving the recognized text 552A, the cloud automated assistant component(s) 120 generate a locally interpretable semantic representation 554 of the recognized text 552A. In some implementations, the cloud automated assistant component(s) 120 generate the locally interpretable semantic representation 554 (e.g., in lieu of or in addition to a cloud based one), responsive to determining that the smart device inferentially referenced by the recognized text 552A (thermostat 145$_{C1}$) is locally controllable by the second assistant client device 110$_2$ and/or another client device in network communication with the second assistant client device 110$_2$.

The locally interpretable semantic representation 554 can be generated based on reference to a remotely stored device topology to determine a "decrease temperature" request is one directed to thermostat 145$_{C1}$ (e.g., it may be the only smart device in the device topology that has "decrease temperature" as a supported state change). Accordingly, the text 552A can be resolved to be inferentially referencing the thermostat 145$_{C1}$ as a target smart device. In generating the cloud semantic representation, the cloud automated assistant component(s) 120 can also resolve "decrease . . . a bit" to mean "2 degrees less than a current set point". This can be based on reference to one or more remotely stored model(s) and/or rule(s) accessible to the cloud automated assistant component(s) 120. The locally interpretable semantic representation 554 can be generated based on these resolutions and can further be generated to enable the client device to include a relative state change representation that dictates how to locally resolve the target set point for "2 degrees less than a current set point". For example, the relative state change representation can be "temp set=(current temp−2 degrees)".

The locally interpretable semantic representation 556 can optionally additionally include: an indication of the adapter that is to be utilized in generating corresponding local control command(s) (e.g., an adapter specific to a manufacturer of the smart device); an indication of the channel (e.g., Bluetooth or Wi-Fi) that is to be utilized to transmit the local control command(s); and/or an indication of the protocol suite that is to be utilized in generating control command(s) based on the locally interpretable semantic representation 556. For example, and as illustrated in cache request 556, the locally interpretable semantic representation can be [device(s)=145$_{C1}$; temp set=(current temp−2 degrees); adapter/channel=C], where "145$_{C1}$" is a unique identifiers for the thermostat 145$_{C1}$ (e.g., a local address for the thermostat 145$_{C1}$), where "temp set=(current temp−2 degrees)" is a current-state dependent sate change representation that is locally interpretable to resolve current state changes; and where "adapter/channel=C" indicates the adapter and/or protocol suite to be utilized in generating local control command(s) (e.g., after determining a current state change) and/or the channel to be utilized to transmit the local control command(s).

The cloud automated assistant component(s) 120 generate and transmit, to the second client device 110$_2$, a cache request 556 that includes the cloud semantic representation 554, and that optionally includes the recognized text 552A and/or a mapping of the recognized text to the cloud semantic representation 554. Responsive to receiving the cache request 556, the second client device 110$_2$ stores a corresponding cache entry that includes a mapping of the recognized text 552A to the cloud semantic representation 554 included in the cache request 556.

In some implementations, and as indicated by dashed lines between the second client device 110$_2$ and the thermostat 145$_{C1}$, the second client device 110$_2$ can utilize the locally interpretable semantic representation, of the cache request (or from a separate transmission from the cloud automated assistant component(s) 120), to locally generate local control commands for the thermostat 145$_{C1}$, and to locally transmit them to the thermostat $145_{C1}$ in response to the spoken utterance of FIG. 5A.

In some alternative implementations, the cloud automated assistant component(s) 120 generate a corresponding cloud semantic representation based on the recognized text 552A. Further, the cloud automated assistant component(s) 120 can utilize the separate cloud semantic representation to generate a corresponding control request. The cloud automated assistant component(s) 120 transmit the control request to a smart device system $140_C$ that corresponds to the thermostat $145_{C1}$. In response, the smart device system $140_C$ can generate corresponding control command(s), and provide those control command(s) to the thermostat $145_{C1}$ to cause its set point to "decrease a bit" (i.e., decrease by 2 degrees, as indicated by the cloud semantic representation).

Figure 5B:
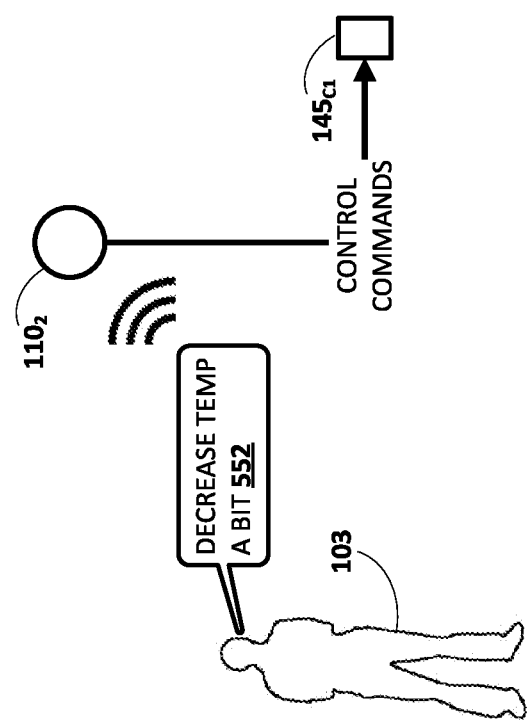
FIG. 5B illustrates an example of how the same spoken utterance of FIG. 5A, received at the client device of FIG. 5A, can be processed after a cache entry with a locally interpretable semantic representation is stored at the client device of FIG. 5A.

FIG. 5B illustrates an example of how another instance of the same spoken utterance 552 of FIG. 5A, received at the second assistant client device $110_2$, can be processed differently after a cache entry with the locally interpretable semantic representation 554 (FIG. 5A) is stored at the second assistant client device $110_2$ in FIG. 5A.

In FIG. 5B, the second assistant client device $110_2$ processes audio data, that captures the spoken utterance 552, to generate recognized text. Further, the second assistant client device $110_2$ determines that the recognized text matches text of the cache entry stored in the local cache of the second assistant client device $110_2$ in FIG. 4A. In response, the second assistant client device $110_2$ identifies the locally interpretable semantic representation 554 of the cache entry, and uses the locally interpretable semantic representation 554 to generate corresponding control commands. It is noted that the generated control commands of FIG. 5B can differ from those of FIG. 5A since the state representation, of the locally interpretable semantic representation 554, is a current-state dependent state representation—and the "current" temperature set point of the thermostat $145_{C1}$ can vary between FIGS. 5A and 5B. For example, in FIG. 5B the second assistant client device $110_2$ can resolve a target set point by subtracting 2 degrees from the current set point, as dictated by the relative state change of the locally interpretable semantic representation 554. The second assistant client device $110_2$ can then process the target set point, utilizing a corresponding adapter, to generate the control commands, and transmit the control commands to an address of the thermostat $145_{C1}$, that is optionally included in the locally interpretable semantic representation 554. In response to receiving the control commands, the thermostat $145_{C1}$ can decrease its set point by 2 degrees.

Figure 6:
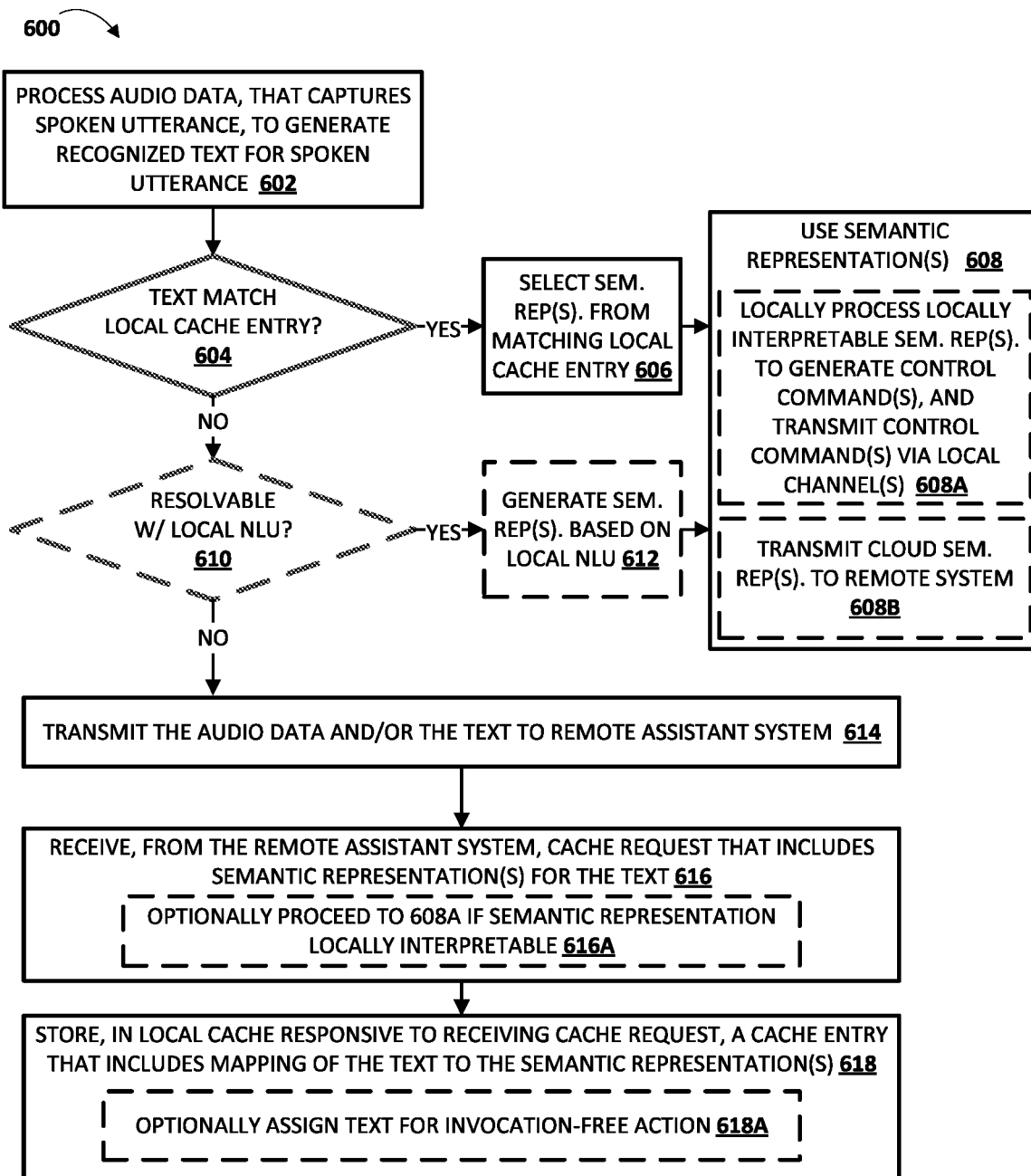
FIG. 6 is a flow chart illustrating an example method that can be implemented by assistant client devices, according to various implementations disclosed herein.

FIG. 6 is a flow chart illustrating an example method 600 that can be implemented by one or more processors of assistant client devices, according to various implementations disclosed herein.

At block 602, an assistant client device processes audio data, that captures a spoken utterance, to generate recognized text for the spoken utterance. In other implementations, instead of processing audio data to generate recognized text, the assistant client device can identify text based on it being typed directly (e.g., using a virtual keyboard) or being provided based on it corresponding to a hardware or software button press (e.g., text of "dim the lights" being mapped to a graphical software button labeled "dim").

Figure 8:
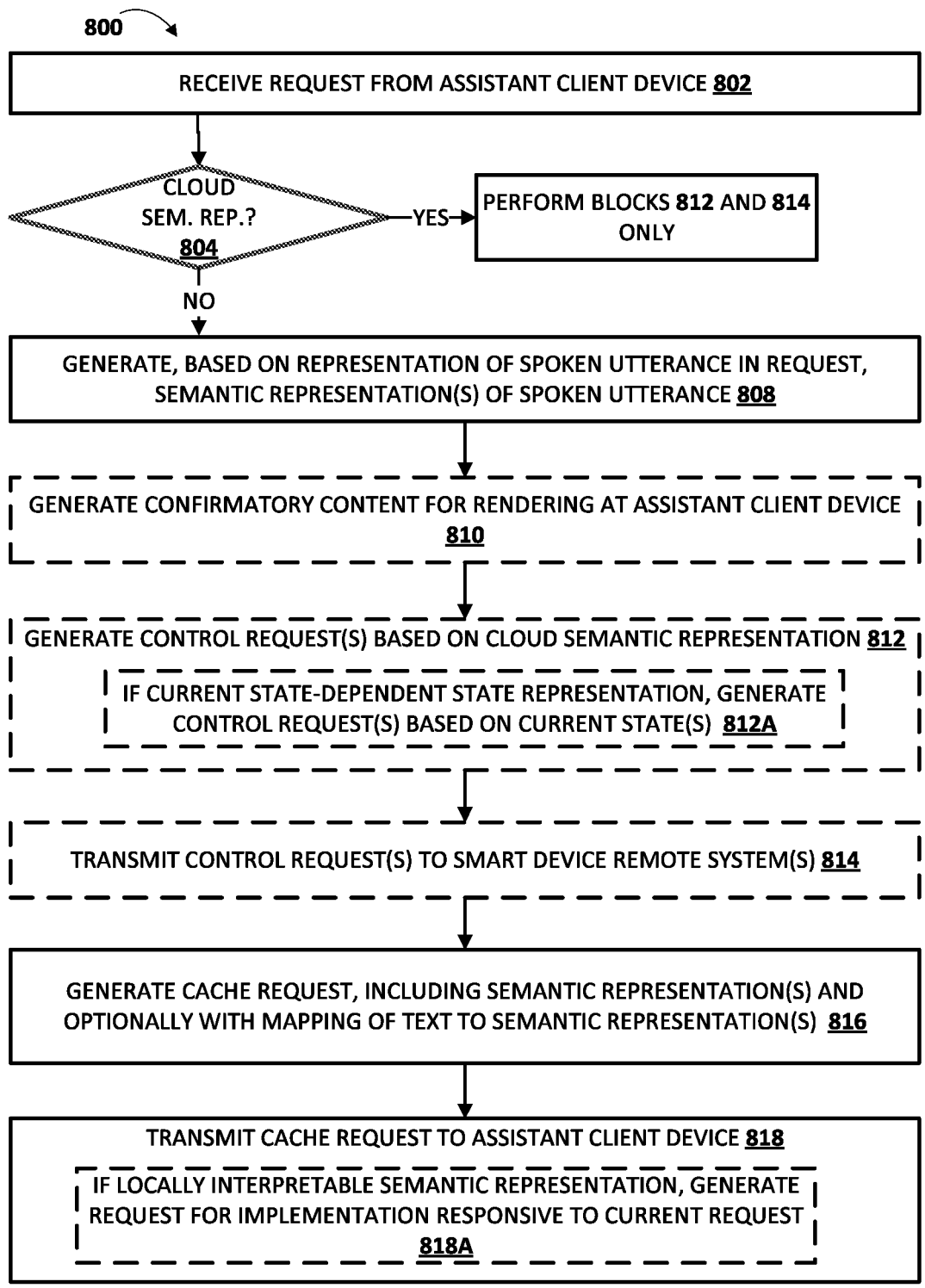
FIG. 8 is a flow chart illustrating an example method that can be implemented by remote assistant systems, according to various implementations disclosed herein.

At block 604, the assistant client device determines whether the text matches a local cache entry. If so, the client device proceeds to block 606, and selects semantic representation(s) that are from the matching local cache entry. At block 608, the system then uses the semantic representation(s). Block 608 can include sub-blocks 608A and/or 608B. At sub-block 608A, the client device locally processes any of the selected semantic representations, that are locally interpretable semantic representations, to generate local control command(s), and transmit(s) the control command(s) via local channel(s). At sub-block 608B, the client device transmits any of the selected semantic representations, that are cloud semantic representations, to a remote system. For example, they can be transmitted to a remote system that can then perform blocks 812 and 814 of method 800 (FIG. 8, described below). In some implementations block 606 can include additional sub-block(s), such as a sub-block where the assistant client device renders any responsive content that is included in the local cache entry. For example, the local cache entry can include responsive text, and the assistant client device can perform local TTS processing on the responsive text, and audibly render the resulting synthesized speech. As another example, the local cache entry can additionally or alternatively include responsive graphic(s), and the graphic(s) can be visually rendered on a display of the assistant client device.

If the decision at block 604 is no, the assistant client device proceeds to optional block 610 and determines whether the text is resolvable with local NLU (e.g., using a local NLU engine and local model(s)). If so, the system proceeds to block 612, generates semantic representation(s) (locally interpretable and/or cloud), then proceeds to block 608 and uses the generated semantic representation(s).

If the decision at block 610 is no (or the decision at 604 is no and 610 is omitted), the client device proceeds to block 614 and transmits the audio data and/or the text to a remote assistant system. Optionally, block 614 can occur before and/or during performance of blocks 604 and/or 610—and further processing at the remote system optionally halted (e.g., responsive to a halt transmission from the client device) responsive to a "yes" determination at either of blocks 604 and 610. For example, if block 614 occurs before and/or during performance of blocks 604 and/or 610, and the assistant client device makes a "yes" determination at blocks 604 and/or 610, it can transmit a halt request to the remote assistant system to cause halting of any further processing, by the remote assistant system, related to the transmitted audio data and/or text. In these and other manners processing at the remote assistant system can be initiated more quickly to reduce latency if the determinations at blocks 604 and/or 610 is "no", while also enabling halting of such processing if the decision is "yes", to conserve remote assistant system resources.

At block 616, the client device receives, from the remote assistant system, a cache request that includes semantic representation(s) for the text, and optionally the text itself (and/or a representation thereof). Block 616 optionally includes sub-block 616A, where the assistant client device optionally proceeds to block 608A to process one or more locally interpretable semantic representation(s) of the cache request (or a separate transmission), if any. Put another way, at block 616 the assistant client device can immediately act upon any locally interpretable semantic representation(s) of the cache request to effectuate any local smart device action(s) responsive to the current spoken utterance or other current user input.

At block 618, the client device stores, in a local cache and responsive to receiving the cache request, a cache entry that includes a mapping of the text to the semantic representation(s) of the cache request.

Block 618 optionally includes sub-block 618A, which can occur at a time near block 618, or at a later time. In sub-block 618A, the client device optionally assigns the text, of the cache entry, for invocation-free action. For example, the client device can assign the text as a "hot phrase" as described herein. Assigning the text as a "hot phrase" can optionally be based on determining that one or more criteria are satisfied. When recognized text, from on-device speech recognition of audio data that is occurring independent of any explicit automated assistant invocation, is determined to match a hot phrase, the assistant client device can automatically initiate one or more corresponding action(s) based on the text (e.g., action(s) based on the semantic representation(s) of a corresponding cache entry).

Figure 7:
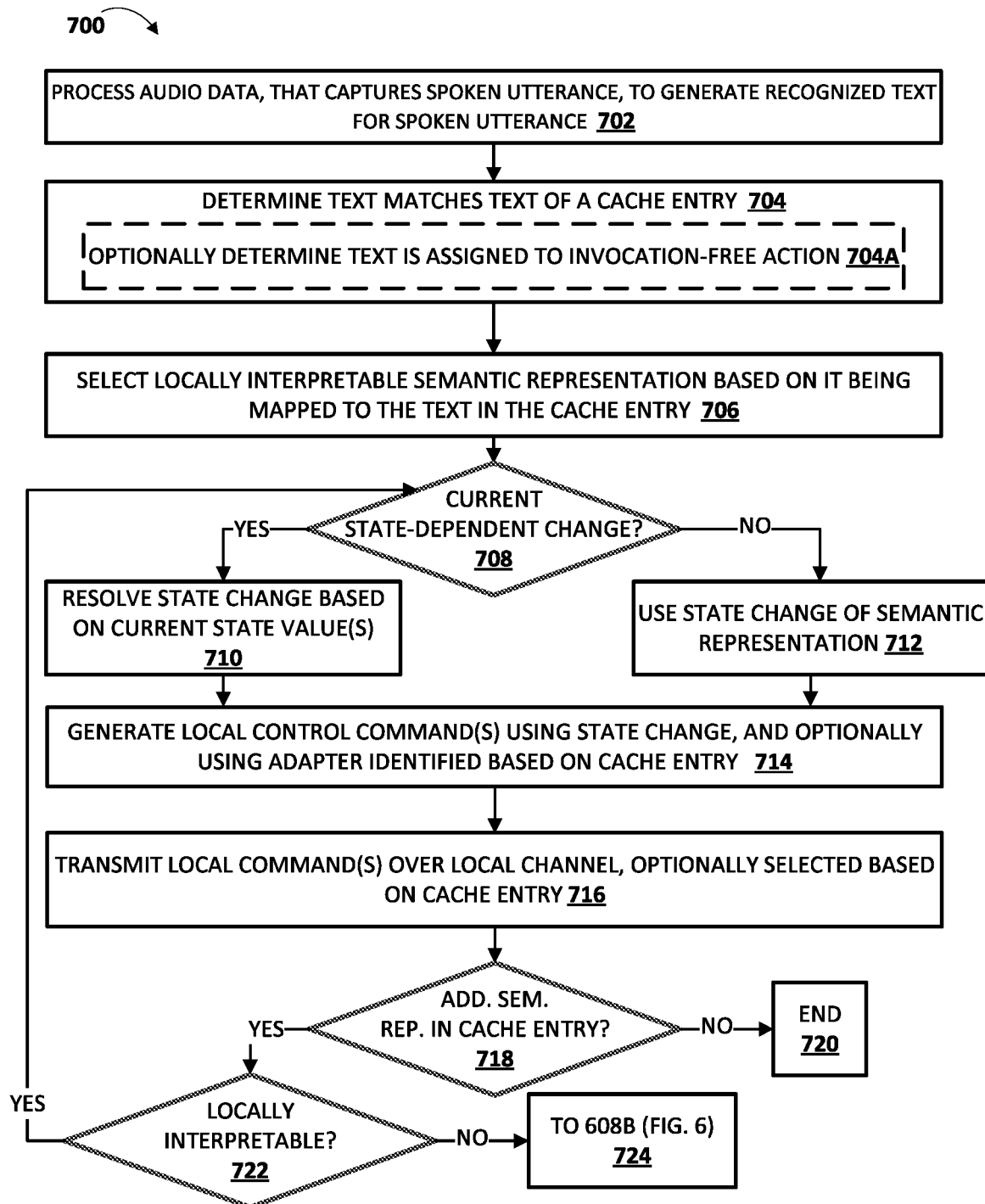
FIG. 7 is a flow chart illustrating another example method that can be implemented by assistant client devices, according to various implementations disclosed herein.

FIG. 7 is a flow chart illustrating another example method 700 that can be implemented by one or more processors of assistant client devices, according to various implementations disclosed herein. Method 700 illustrates a particular implementation of method 600 of FIG. 6, where it is determined that text matches text of a cache entry (i.e., a "yes" in block 604 of FIG. 6), and where semantic representation(s) of the cache entry include locally interpretable semantic representation(s).

At block 702, an assistant client device processes audio data, that captures a spoken utterance, to generate recognized text for the spoken utterance. In other implementations, instead of processing audio data to generate recognized text, the assistant client device can identify text based on it being typed directly (e.g., using a virtual keyboard) or being provided based on it corresponding to a hardware or software button press (e.g., text of "dim the lights" being mapped to a graphical software button labeled "dim").

At block 704, the assistant client device determines that the text matches text of a cache entry. Block 704 optionally includes sub-block 704A, where the client device optionally determines the text is assigned (e.g., at the assistant client device) to invocation-free action. For example, when the processing of block 702 is occurring without an explicit automated assistant invocation, block 704A can optionally be performed. Moreover, in such an example, one or more subsequent blocks of method 700 may only be performed if it is determined the text is assigned (e.g., locally at the client device) to invocation-free action. Put another way, block 704A can be performed when the processing of block 702 is occurring without an explicit automated assistant invocation, and when text is determined to not be assigned to invocation-free action, it can be discarded and without performing further blocks of method 700 based on the text—whereas when text is determined to be assigned to invocation-free action, further blocks of method 700 will be performed based on the text.

At block 706, the client device selects a locally interpretable semantic representation, based on it being mapped, in the cache entry, to the text of the cache entry.

At block 708, the client device determines whether a state change, of the locally interpretable semantic representation, is a current-state dependent state change. If not, the client device proceeds to block 712 and uses the state change of the locally interpretable semantic representation. For instance, if the state change indicates a fixed value, that fixed value can be utilized as the state change. If the determination at block 708 is "yes", the client device proceeds to block 710, and resolves the state change based on current state value(s). For example, if the state change is current state-dependent, it can be resolved by identifying the current state of one or more smart devices, then determining the state change based on the identified current state(s). For instance, if the state change is "set point=(current temperature+3 degrees)", it can be resolved by identifying the "current temperature".

At block 712, the client device generates local control command(s) using the sate change, and optionally using an adapter identified based on the cache entry.

At block 714, the client device transmits the local command(s) over a local channel that is optionally selected based on the cache entry (e.g., explicitly identified in the cache entry, or selected based on a protocol suite, smart device, and/or radio/channel identified in the cache entry). The transmitted local command(s) can be addressed to smart device(s) based on those addresses being identified in the locally interpretable semantic representation, or being resolvable therefrom.

At block 718, the client device determines if there are any additional unprocessed semantic representations in the cache entry. If not, the client device proceeds to block 720 and method 700 ends. If so, the client device proceeds to block 722 and determines whether a next unprocessed semantic representation is locally interpretable. If so, the client device proceeds back to block 708. If not (i.e., it is a cloud semantic representation), the client device proceeds to block 608B of method 600 of FIG. 6, then returns back to block 718 after performing block 608B.

FIG. 8 is a flow chart illustrating an example method 800 that can be implemented by one or more processors of a remote assistant system, according to various implementations disclosed herein.

At block 802, the system receives a request from an assistant client device. At block 804, the system determines whether the request is a semantic cloud representation. If so, the system performs blocks 812 and 814 (described below) of method 800, without performing any other blocks of method 800.

If not, the system proceeds to block 808 and generates, based on a representation of a spoken utterance in a request, semantic representation(s) of the spoken utterance. In other implementations, the representation(s) can be of a typed utterance, or of text mapped to a press of a hardware element or software graphical element.

At optional block 810, the system generates confirmatory content for rendering at the assistant client device in response to the request.

At optional block 812, the system generates control request(s) based on a cloud semantic representation generated based on the request. Optional block 812 can include optional block 812A, where the system generates the control request(s) based on current state(s) of smart device(s), if a state representation of the semantic representation is a relative/current state-dependent state representation.

At optional block 814, the system transmit(s) the generated control request(s) to smart device remote system(s).

At block 816, the system generates a cache request that includes semantic representation(s) (locally interpretable and/or cloud) and optionally includes a mapping of the text to the semantic representation(s).

At block 818, the system transmits the cache request to the assistant client device. Block 818 optionally includes sub-block 818A, where the system, if the semantic representation of the cache request is a locally interpretable semantic representation, optionally generates a separate request for implementation of the locally interpretable semantic representation, responsive to the current request.

Figure 9:
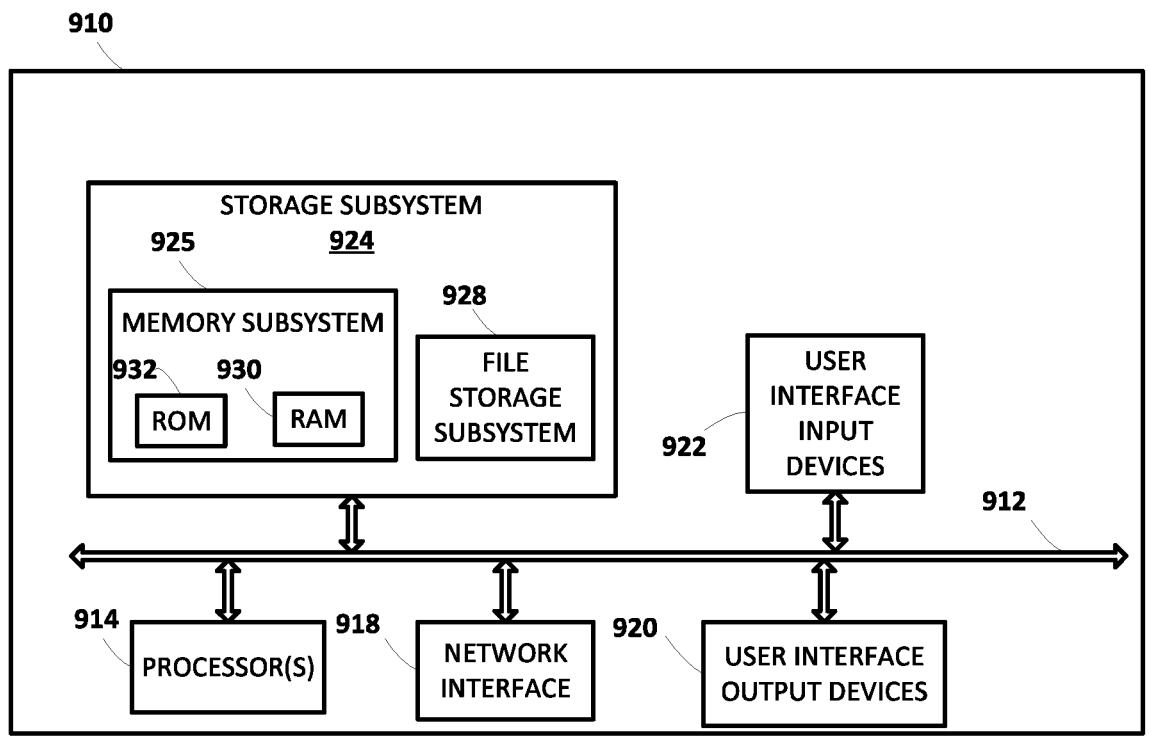
FIG. 9 illustrates an example architecture of a computing device.

FIG. 9 is a block diagram of an example computing device 910 that may optionally be utilized to perform one or more aspects of techniques described herein. Computing device 910 typically includes at least one processor 914 which communicates with a number of peripheral devices via bus subsystem 912. These peripheral devices may include a storage subsystem 924, including, for example, a memory subsystem 925 and a file storage subsystem 926, user interface output devices 920, user interface input devices 922, and a network interface subsystem 916. The input and output devices allow user interaction with computing device 910. Network interface subsystem 916 provides an interface to outside networks and is coupled to corresponding interface devices in other computing devices.

User interface input devices 922 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 910 or onto a communication network.

User interface output devices 920 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 910 to the user or to another machine or computing device.

Storage subsystem 924 stores programming and data constructs that provide the functionality of some or all of the modules described herein. For example, the storage subsystem 924 may include the logic to perform selected aspects of one or more methods described herein.

These software modules are generally executed by processor 914 alone or in combination with other processors. Memory 925 used in the storage subsystem 924 can include a number of memories including a main random access memory (RAM) 930 for storage of instructions and data during program execution and a read only memory (ROM) 932 in which fixed instructions are stored. A file storage subsystem 926 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 926 in the storage subsystem 924, or in other machines accessible by the processor(s) 914.

Bus subsystem 912 provides a mechanism for letting the various components and subsystems of computing device 910 communicate with each other as intended. Although bus subsystem 912 is shown schematically as a single bus, alternative implementations of the bus subsystem may use multiple busses.

Computing device 910 can be of varying types including a workstation, server, computing cluster, blade server, server farm, or any other data processing system or computing device. Due to the ever-changing nature of computers and networks, the description of computing device 910 depicted in FIG. 9 is intended only as a specific example for purposes of illustrating some implementations. Many other configurations of computing device 910 are possible having more or fewer components than the computing device depicted in FIG. 9.

In situations in which certain implementations discussed herein may collect or use personal information about users (e.g., user data extracted from other electronic communications, information about a user's social network, a user's location, a user's time, a user's biometric information, and a user's activities and demographic information, relationships between users, etc.), users are provided with one or more opportunities to control whether information is collected, whether the personal information is stored, whether the personal information is used, and how the information is collected about the user, stored and used. That is, the systems and methods discussed herein collect, store and/or use user personal information only upon receiving explicit authorization from the relevant users to do so.

In some implementations, a method is provided that includes receiving, at a remote assistant system and from an assistant client device, a representation of a spoken utterance captured at the assistant client device. The spoken utterance is a request related to one or more states of one or more smart devices that are linked with the assistant client device. As one example, the request can be a request to alter the state(s) of the smart device(s) (i.e., cause the state(s) to transition from current state value(s) to new state value(s)). The representation of the spoken utterance comprises audio data that captures the spoken utterance and/or text, of the spoken utterance, that is generated at the client device utilizing a speech-to-text model stored locally on the client device. The method further includes, at the remote system, and responsive to receiving the representation of the spoken utterance: generating, based on the representation of the spoken utterance, a semantic representation of the spoken utterance; generating, based on the semantic representation of the spoken utterance, at least one control request to transmit to at least one smart device remote system that controls the one or more smart devices, where the at least one control request differs from the semantic representation; transmitting the at least one control request to the at least one smart device remote system to cause the at least one smart device remote system to provide one or more corresponding commands to the one or more smart devices; and transmitting, to the assistant client device, a cache request that includes the semantic representation. Transmitting the cache request to the assistant client device causes the assistant client device to store, in a cache on the assistant client device: a cache entry that includes a mapping of the text to the semantic representation.

These and other implementations of the technology can optionally include one or more of the following features.

In some implementations, the method further includes, subsequent to transmitting the cache request to the assistant client device: capturing, at the assistant client device, additional audio data that captures an additional spoken utterance; processing, using the speech-to-text model stored locally on the assistant client device, the additional audio data to generate current text that corresponds to the additional spoken utterance; determining that the current text matches the text of the cache entry; and in response to determining that the current text matches the text of the cache entry, and in response to the cache entry including the mapping of the text to the semantic representation: transmitting the semantic representation to the remote assistant system. In some of those implementations, processing the additional audio data to generate the current text is performed without detection of an explicit automated assistant invocation at the assistant client device. In some versions of those implementations, transmitting the semantic representation to the remote assistant system is further in response to determining that the current text satisfies one or more criteria for enabling matching text to be acted upon without explicit automated assistant invocation at the assistant client device. In some additional or alternative versions, the method further includes: receiving, at the remote assistant system, the semantic representation transmitted from the assistant client device; generating, based on the semantic representation, at least one alternative control request to transmit to the at least one smart device remote system that controls the one or more smart devices, where the at least one alternative control request differs from the at least one control request; and transmitting the at least one alternative control request to the at least one smart device remote system to cause the at least one smart device remote system to alter the one or more states of the one or more smart devices. Optionally, in those alternative or additional implementations: generating the at least one control request is further based on at least one current state of the one or more smart devices at a time of generating the at least one control request; generating the at least one alternative control request is further based on at least one alternative current state of the one or more smart devices at a different time of generating the at least one alternative control request; the at least one alternative control request differs from the at least one control request based on the at least one current state differing from the at least one alternative current state.

In some implementations, generating the semantic representation of the spoken utterance is further based on a device topology for an account of the assistant client device, where the device topology defines the assistant client device, the one or more smart devices, additional assistant client devices, and additional smart devices. In some of those implementations, generating the semantic representation of the spoken utterance further based on the device topology includes resolving, based on the device topology, that an ambiguous term, in the text of the spoken utterance, references the one or more smart devices.

In some implementations, the semantic representation includes: a state change representation of the one or more state changes and, for each of the one or more smart devices, a corresponding unique identifier. In some versions of those implementations the state change representation is a relative state change representation that defines the one or more state changes in a relative manner, and not in an absolute manner. In some additional or alternative versions of those implementations, the method further includes: determining, at the remote assistant system or the assistant client device, an alteration to the device topology; and in response to determining the alteration to the device topology: causing the cache entry to be cleared from the cache of the assistant device. Determining the alteration to the device topology can optionally include: determining that the alteration is to one or more properties defined, in the device topology, for the assistant client device, the one or more smart devices, and/or one or more rooms assigned to the assistant client device and/or the one or more smart devices; and, optionally, causing the cache entry to be cleared from the cache can be further in response to determining the cache entry is affected by the one or more properties.

In some implementations, the method further includes receiving, at the remote assistant system and from an additional assistant client device, an additional representation of the spoken utterance. The spoken utterance is captured at the additional assistant client device, and the additional assistant client device and the assistant client device are both members of a common device topology. In some of those implementations the method further includes, at the remote system, and responsive to receiving the additional representation of the spoken utterance: generating, based on the representation of the spoken utterance, an alternative semantic representation of the spoken utterance, where the alternative semantic representation of the spoken utterance differs from the semantic representation based on the additional representation being captured at the additional assistant client device and the representation being captured at the assistant client device; and transmitting, to the additional assistant client device, an additional cache request that includes the alternative semantic representation. Transmitting the additional cache request to the additional assistant client device causes the additional assistant client device to store, in an additional cache on the additional assistant client device: an additional cache entry that includes a mapping of the text to the alternative semantic representation.

In some implementations, a method is provided that includes receiving, at a remote assistant system and from an assistant client device, a representation of a spoken utterance captured at the assistant client device. The spoken utterance is a request for altering at least a given state of a given smart device that is linked with the assistant client device. The representation of the spoken utterance includes audio data that captures the spoken utterance and/or text, of the spoken utterance, that is generated at the client device utilizing a speech-to-text model stored locally on the client device. The method further includes at the remote system, and responsive to receiving the representation of the spoken utterance: determining that the given smart device is controllable locally by the assistant client device and/or by an additional client device having a local connection to the assistant client device; generating a semantic representation, of the spoken utterance, that includes a locally interpretable semantic representation; and transmitting, to the assistant client device, a cache request that comprises the semantic representation. The locally interpretable semantic representation is locally interpretable, by the assistant client device and/or the additional client device, to generate a corresponding control command that is transmittable over a local channel to cause the altering of at least the given state of the given smart device. Generating the locally interpretable semantic representation for the at least one smart device includes including the locally interpretable semantic representation, in the semantic representation, responsive to determining that the given smart device is controllable locally. Transmitting the cache request to the assistant client device causes the assistant client device to store, in a cache on the assistant client device: a cache entry that includes a mapping of the text to the semantic representation.

These and other implementations of the technology can optionally include one or more of the following features.

In some implementations, the method further includes, subsequent to transmitting the cache request to the assistant client device: capturing, at the assistant client device, additional audio data that captures an additional spoken utterance; processing, using a voice-to-text model stored locally on the assistant client device, the additional audio data to generate current text that corresponds to the additional spoken utterance; determining that the current text matches the text of the cache entry; and in response to determining that the current text matches the text of the cache entry, and in response to the cache entry including the mapping of the text to the semantic representation: processing, at the assistant client device, the locally interpretable semantic representation to generate a given control command, and transmitting, via a local channel, the given control command to cause the altering of at least the given state of the given smart device. In some versions of those implementations, the locally interpretable semantic representation includes: an identifier of the given smart device; and a current-state dependent state change representation that defines the altering, of at least the given state of the given smart device, relative to a corresponding current value for the given state of the given smart device. In some of those versions, processing the locally interpretable semantic representation to generate the given control command includes: determining, at the assistant client device, a current value for the given state of the given smart device; generating the given control command based on applying the current value to the current-state dependent state change representation. Optionally, the locally interpretable semantic representation further includes an indication of a manufacturer of the smart device, and generating the given control command optionally includes utilizing an adapter, stored locally at the assistant client device, responsive to the adapter being assigned to the indication of the manufacturer of the smart device. Optionally, the method further includes selecting the local channel, for transmitting the given control command, based on the local channel being directly or indirectly indicated in the locally interpretable semantic representation. For example, based on the local channel being assigned to an indication of the manufacturer of the smart device that is included in the locally interpretable semantic representation and/or being assigned to a protocol suite that is included in the locally interpretable semantic representation.

In some implementations, processing the additional audio data to generate the current text is performed without detection of an explicit automated assistant invocation at the assistant client device. In some of those implementations, transmitting the given control command is further in response to determining that the current text satisfies one or more criteria for enabling matching text to be acted upon without explicit automated assistant invocation at the assistant client device.

In some implementations, generating the semantic representation of the spoken utterance is further based on a device topology for an account of the assistant client device. The device topology defines the assistant client device, the given smart device, additional assistant client devices, and additional smart devices. In some of those implementations, generating the semantic representation of the spoken utterance includes resolving that an ambiguous term, in the text of the spoken utterance, references the given smart device.

In some implementations, the method further includes: determining, at the remote assistant system or the assistant client device, an alteration to the device topology; and in response to determining the alteration to the device topology: causing the cache entry to be cleared from the cache of the assistant client device. In some of those implementations, determining the alteration to the device topology includes: determining that the alteration is to one or more properties defined, in the device topology, for the assistant client device, the given smart device, and/or one or more rooms assigned to the assistant client device and/or the given smart device; and causing the cache entry to be cleared from the cache is further in response to determining the cache entry is affected by the one or more properties.

In some implementations, a method is provided that includes storing, in a cache on the client device: a cache entry that includes a mapping of text to a semantic representation. The semantic representation includes a locally interpretable semantic representation that is locally interpretable by the client device. The method further includes capturing, at the client device, additional audio data that captures a spoken utterance. The method further includes processing, using a voice-to-text model stored locally on the client device, the additional audio data to generate current text that corresponds to the spoken utterance. The method further includes determining that the current text matches the text of the cache entry. The method further includes in response to determining that the current text matches the text of the cache entry, and in response to the cache entry including the mapping of the text to the semantic representation: processing, at the client device, the locally interpretable semantic representation to generate a given control command; and transmitting, via a local channel, the given control command to cause the altering of at least the given state of the given smart device.

What is claimed is:

1. A method implemented by one or more processors of a client device, the method comprising:
   storing, in a cache on the client device: a cache entry that includes a mapping of text to a semantic representation, wherein the semantic representation includes a locally interpretable semantic representation that is locally interpretable by the client device;
   capturing, at the client device, audio data that captures a spoken utterance;
   processing, using a voice-to-text model stored locally on the client device, the audio data to generate current text that corresponds to the spoken utterance;
   determining that the current text matches the text of the cache entry; and
   in response to determining that the current text matches the text of the cache entry, and in response to the cache entry including the mapping of the text to the semantic representation:
   processing, at the client device, the locally interpretable semantic representation to generate a given control command, the given control command differing from the locally interpretable semantic representation,
       wherein the given control command is generated responsive to a determination that the locally interpretable semantic representation is not locally interpretable by a given smart device; and
   transmitting, via a local channel, the given control command to cause the altering of at least the given state of the given smart device.

2. The method of claim 1, wherein the locally interpretable semantic representation comprises:
   an identifier of the given smart device; and
   a current-state dependent state change representation that defines the altering, of at least the given state of the given smart device, relative to a corresponding current value for the given state of the given smart device.

3. The method of claim 2, wherein processing the locally interpretable semantic representation to generate the given control command comprises:
   determining, at the client device, a current value for the given state of the given smart device;
   generating the given control command based on applying the current value to the current-state dependent state change representation.

4. The method of claim 3, wherein the given smart device is a smart light, wherein the given state is a brightness intensity level, and the current value reflects a current brightness intensity level.

5. The method of claim 3, wherein the given smart device is a smart thermostat, wherein the given state is a temperature set point, and the current value reflects a current temperature set point.

6. The method of claim 1, wherein the locally interpretable semantic representation comprises an indication of a manufacturer of the smart device.

7. The method of claim 6, wherein generating the given control command comprises utilizing an adapter, stored locally at the assistant client device, responsive to the adapter being assigned to the indication of the manufacturer of the smart device.

8. The method of claim 6, further comprising:
selecting the local channel, for transmitting the given control command, based on the local channel being assigned to the indication of the manufacturer of the smart device.

9. The method of claim 1, wherein processing the audio data to generate the current text is performed without detection of an explicit automated assistant invocation at the client device.

10. The method of claim 9, wherein transmitting the given control command is further in response to determining that the current text satisfies one or more criteria for enabling matching text to be acted upon without explicit automated assistant invocation at the assistant client device.

11. The method of claim 1, wherein the locally interpretable semantic representation comprises content that reflects the altering of at least the given state of the given smart device, and further comprising:
in response to determining that the current text matches the text of the cache entry:
rendering the content at the client device.

12. The method of claim 11, wherein the content comprises graphics and wherein rendering the content comprises rending the graphics at a display of the client device.

13. The method of claim 11, wherein the content comprises text, and further comprising:
processing the text, using a local text-to-speech engine of the client device, to generate synthesized speech that corresponds to the text;
wherein rendering the content comprises rendering the synthesized speech via one or more speakers of the client device.

14. The method of claim 11, wherein the content comprises audio data and wherein rendering the content comprises rending the audio data via one or more speakers of the client device.

15. A client device comprising:
one or more speakers;
one or more microphones;
one or more processors;
memory storing computer-executable instructions which, when executed by the one or more processors, causes the one or more processors to perform a method comprising:
storing, in a cache on the client device: a cache entry that includes a mapping of text to a semantic representation, wherein the semantic representation includes a locally interpretable semantic representation that is locally interpretable by the client device;
capturing, via the one or more microphones, audio data that captures a spoken utterance;
processing, using a voice-to-text model stored locally on the client device, the audio data to generate current text that corresponds to the spoken utterance;
determining that the current text matches the text of the cache entry; and
in response to determining that the current text matches the text of the cache entry, and in response to the cache entry including the mapping of the text to the semantic representation:
processing, at the client device, the locally interpretable semantic representation to generate a given control command, the given control command differing from the locally interpretable semantic representation,
wherein the given control command is generated responsive to a determination that the locally interpretable semantic representation is not locally interpretable by a given smart device; and
transmitting, via a local channel, the given control command to cause the altering of at least the given state of the given smart device.

16. The client device of claim 15, wherein the locally interpretable semantic representation comprises:
an identifier of the given smart device; and
a current-state dependent state change representation that defines the altering, of at least the given state of the given smart device, relative to a corresponding current value for the given state of the given smart device.

17. The client device of claim 15, wherein the locally interpretable semantic representation comprises an indication of a manufacturer of the smart device.

18. The client device of claim 17, wherein generating the given control command comprises utilizing an adapter, stored locally at the assistant client device, responsive to the adapter being assigned to the indication of the manufacturer of the smart device.

19. The client device of claim 17, wherein the method further comprises:
selecting the local channel, for transmitting the given control command, based on the local channel being assigned to the indication of the manufacturer of the smart device.

20. The client device of claim 15, wherein the locally interpretable semantic representation comprises content that reflects the altering of at least the given state of the given smart device, and wherein the method further comprises:
in response to determining that the current text matches the text of the cache entry:
rendering the content at the client device.

* * * * *